United States Patent
Bergh et al.

(10) Patent No.: US 9,481,598 B2
(45) Date of Patent: Nov. 1, 2016

(54) LASER CUTTING STRENGTHENED GLASS

(71) Applicant: Kinestral Technologies, Inc., South San Francisco, CA (US)

(72) Inventors: Howard S Bergh, Hillsborough, CA (US); Nicolas Timmerman, San Francisco, CA (US)

(73) Assignee: Kinestral Technologies, Inc., South San Francisco, CA (US)

( * ) Notice: Subject to any disclaimer, the term of this patent is extended or adjusted under 35 U.S.C. 154(b) by 0 days.

(21) Appl. No.: 14/212,841

(22) Filed: Mar. 14, 2014

(65) Prior Publication Data

US 2014/0340730 A1 Nov. 20, 2014

Related U.S. Application Data

(60) Provisional application No. 61/794,546, filed on Mar. 15, 2013.

(51) Int. Cl.
| | |
|---|---|
| *B23K 26/00* | (2014.01) |
| *G02F 1/153* | (2006.01) |
| *C03B 33/09* | (2006.01) |
| *B23K 26/38* | (2014.01) |
| *E06B 3/66* | (2006.01) |
| *B23K 26/40* | (2014.01) |

(52) U.S. Cl.
CPC ............ *C03B 33/091* (2013.01); *B23K 26/38* (2013.01); *B23K 26/40* (2013.01); *E06B 3/66* (2013.01); *G02F 1/1533* (2013.01); *B23K 2203/50* (2015.10); *Y10T 428/24777* (2015.01)

(58) Field of Classification Search
CPC ............ B23K 26/006; B23K 26/0057; B23K 26/0054; B23K 26/38; B23K 26/42; B23K 26/53; B23K 26/55; B23K 2203/54; B23K 26/4075; B23K 26/1476
USPC ............ 219/121.72, 121.61, 121.69, 121.67; 359/265–275; 345/105
See application file for complete search history.

(56) References Cited

U.S. PATENT DOCUMENTS

| 5,442,478 A | 8/1995 | Lampert et al. |
| 5,609,284 A | 3/1997 | Kondratenko |
(Continued)

FOREIGN PATENT DOCUMENTS

| WO | 2010100147 | 9/2010 |
| WO | 2012006736 | 1/2012 |

OTHER PUBLICATIONS

Yoshino et al, Micromachining with a High Repetition Rate Femtosecond Fiber Laser, Journal of Laser Micro/Nanoengineering, 2008, 3(3), 157-162.
(Continued)

*Primary Examiner* — Tuyen Tra
(74) *Attorney, Agent, or Firm* — Womble Carlyle Sandridge & Rice LLP

(57) ABSTRACT

Methods for cutting strengthened glass are disclosed. The methods can include using a laser. The strengthened glass can include chemically strengthened, heat strengthened, and heat tempered glass. Strengthened glass with edges showing indicia of a laser cutting process are also disclosed. The strengthened glass can include an electrochromic film.

24 Claims, 29 Drawing Sheets

(56) References Cited

U.S. PATENT DOCUMENTS

| | | | |
|---|---|---|---|
| 6,407,360 B1 | 6/2002 | Choo et al. | |
| 6,787,732 B1 | 9/2004 | Xuan | |
| 8,327,666 B2 | 12/2012 | Harvey et al. | |
| 8,824,140 B2 * | 9/2014 | Prest | G06F 1/1656 361/679.55 |
| 2003/0006221 A1 | 1/2003 | Hong et al. | |
| 2007/0090100 A1 | 4/2007 | Yonai et al. | |
| 2009/0324899 A1 | 12/2009 | Feinstein et al. | |
| 2010/0206008 A1 | 8/2010 | Harvey et al. | |
| 2011/0049765 A1 | 3/2011 | Li | |
| 2011/0261429 A1 * | 10/2011 | Sbar | B32B 17/10045 359/265 |
| 2011/0304899 A1 | 12/2011 | Kwak et al. | |
| 2012/0047956 A1 | 3/2012 | Li | |
| 2012/0182593 A1 | 7/2012 | Collins et al. | |
| 2012/0200908 A1 | 8/2012 | Bergh et al. | |
| 2013/0126573 A1 | 5/2013 | Hosseini et al. | |
| 2013/0266757 A1 * | 10/2013 | Giron | C03B 33/0222 428/98 |

OTHER PUBLICATIONS

Patent Cooperation Treaty, International Search Report issued for PCT/US2014/028679, mailed Aug. 8, 2014, 4 pages.

Popov, A. V., Increasing the quality of diamond wheels for edge grinding flat glass, Glass and Ceramics, 2010, vol. 67(7-8): 252-254.

Gay et al., Cutting Strengthened Glass using Bursts of Picosecond Pulses from a MOPA Fiber Laser, Proceedings of SLPC2014—the 1st Smart Laser Processing Conference, 2014, 5 pages.

European Patent Office, Supplement European Search Report for EP12744192.1 dated Jul. 2, 2014, 9 pages.

Dergachev et al., Filamentation of IR and UV femtosecond pulses upon focusing in air, Quantum Electronics, 2013, 43(1):29-36.

Bengtsson et al., Picosecond lasers come of age for micromachining, Industrial Laser Solutions for Manufacturing, May 1, 2013, retrieved from http://www.industrial-lasers.com/articles/print/volume-28/issue-3/features/picosecond-lasers-come-of-age-for-micromachining.htm.

* cited by examiner

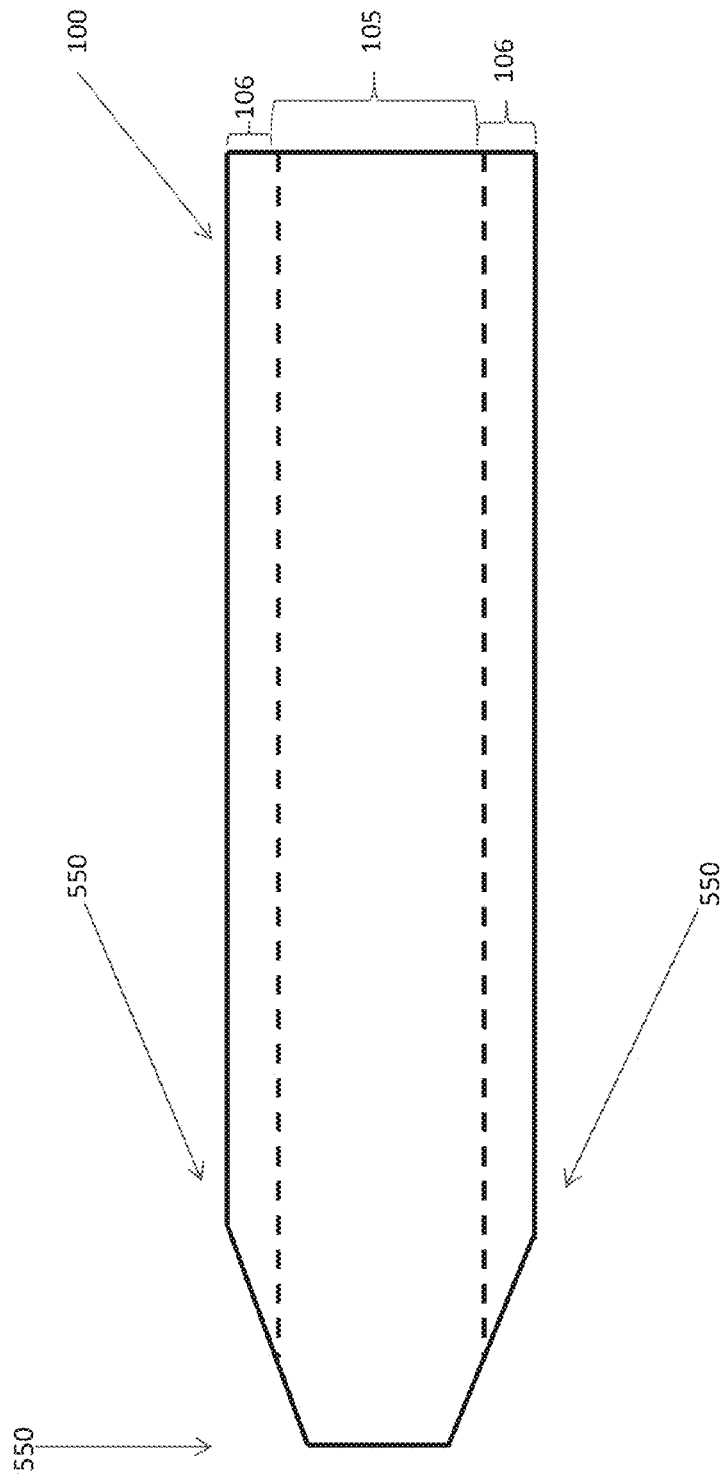

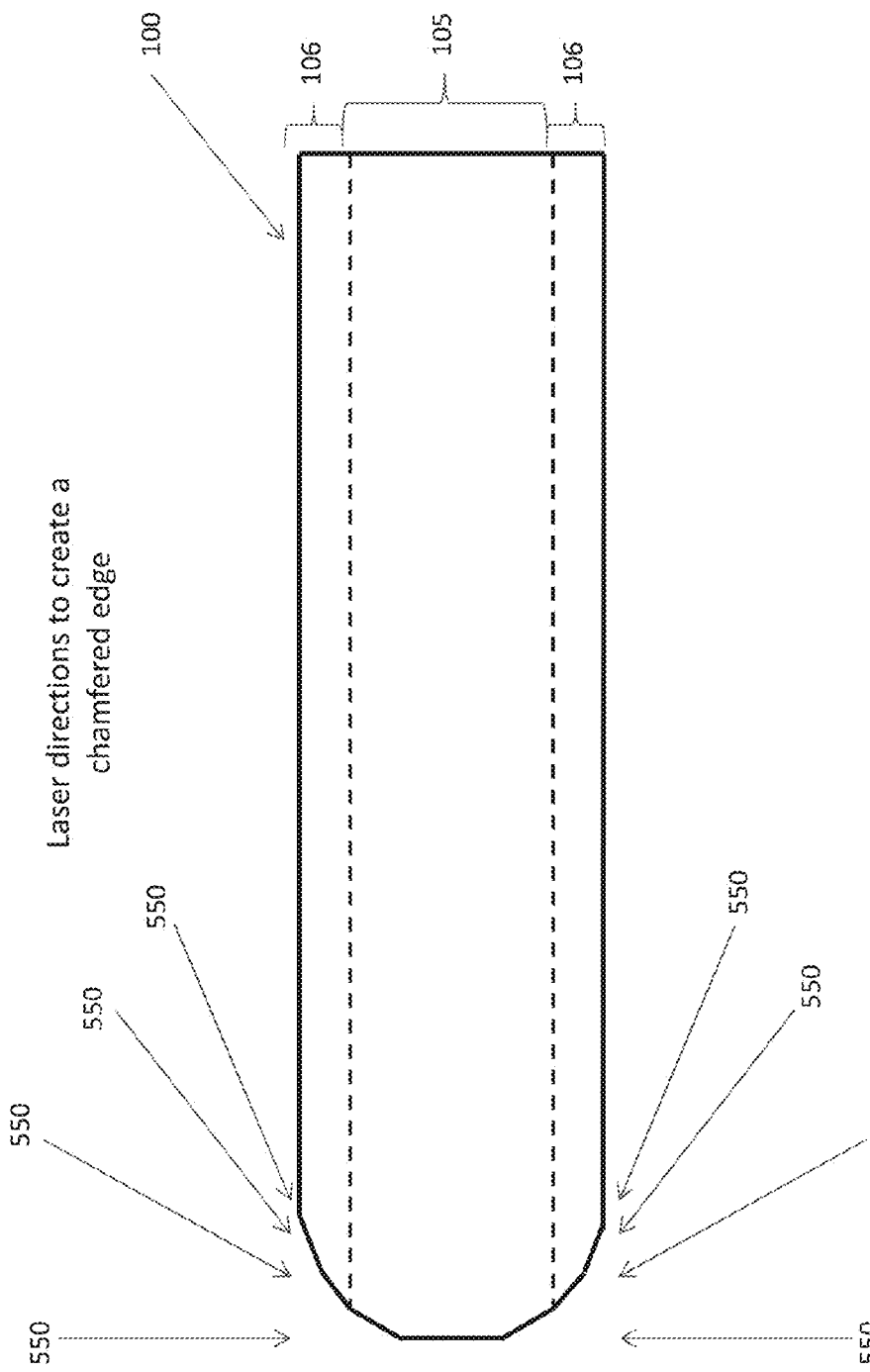

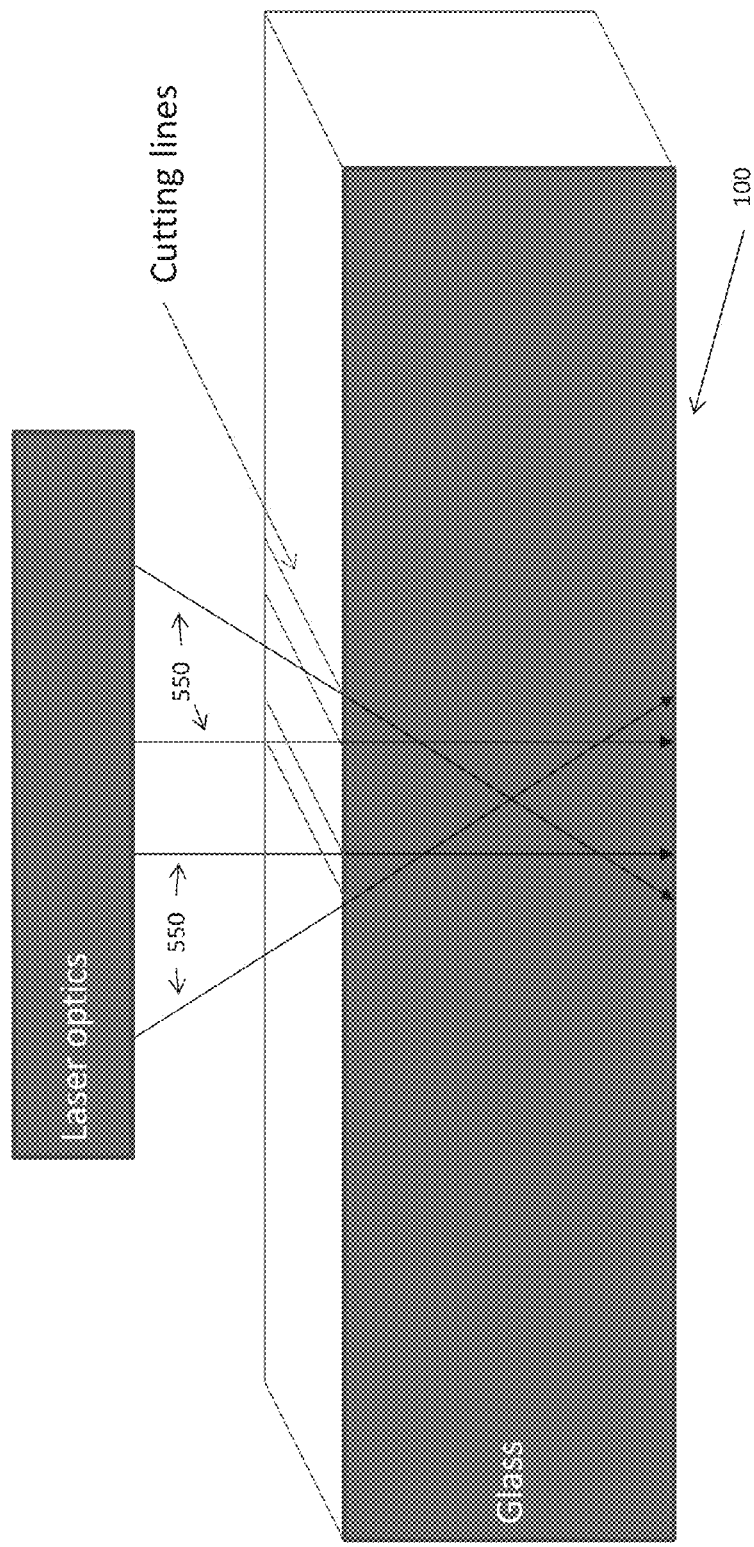

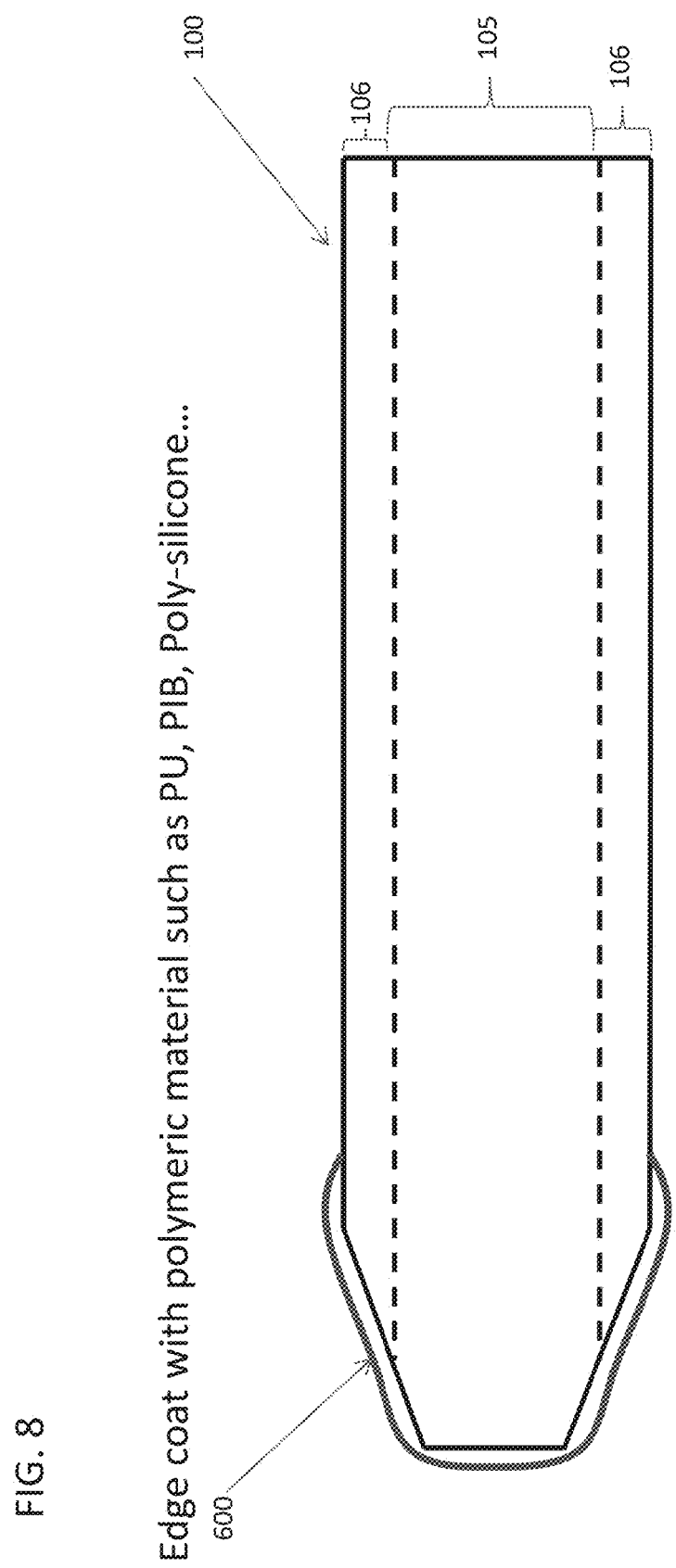

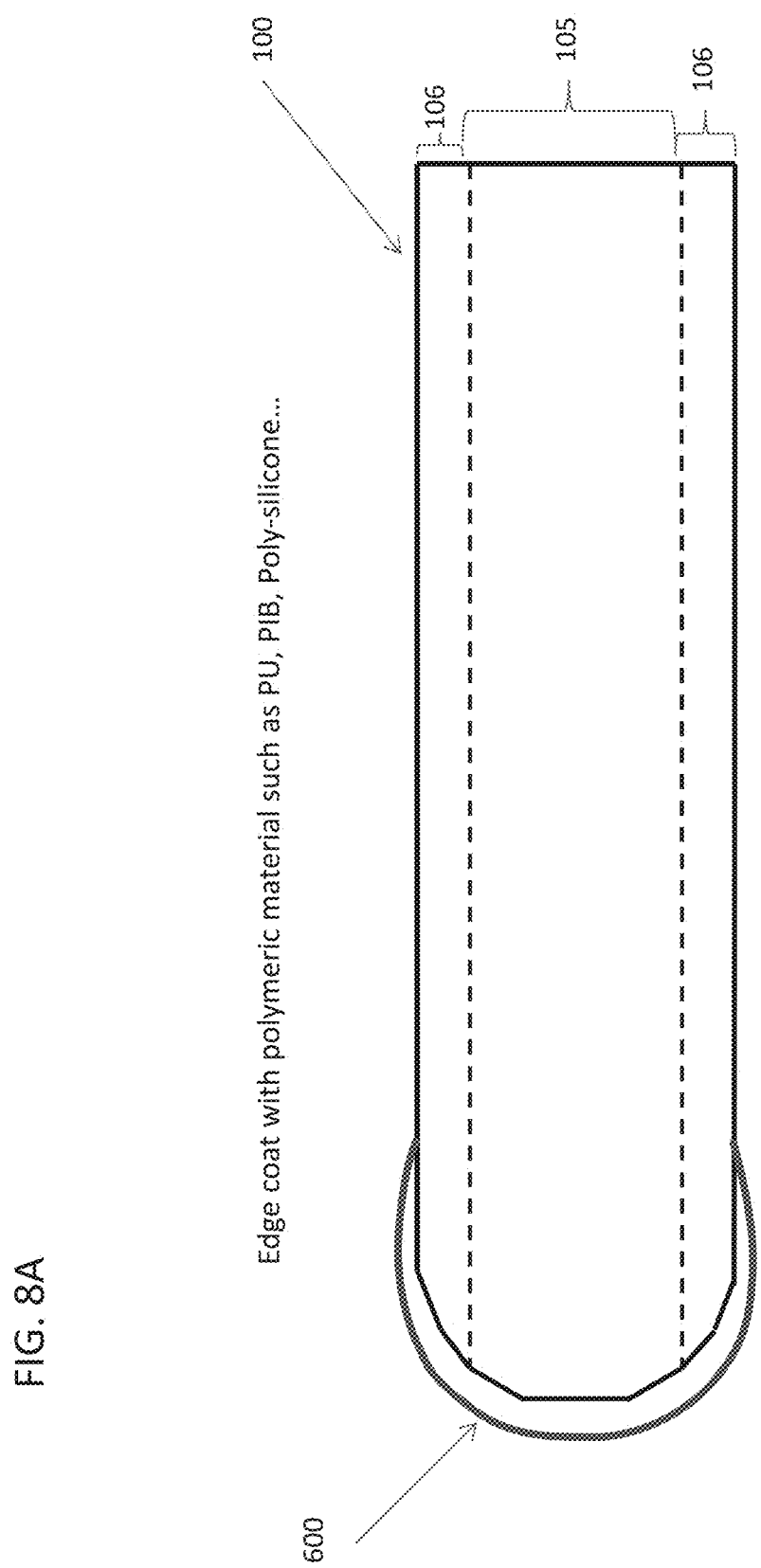

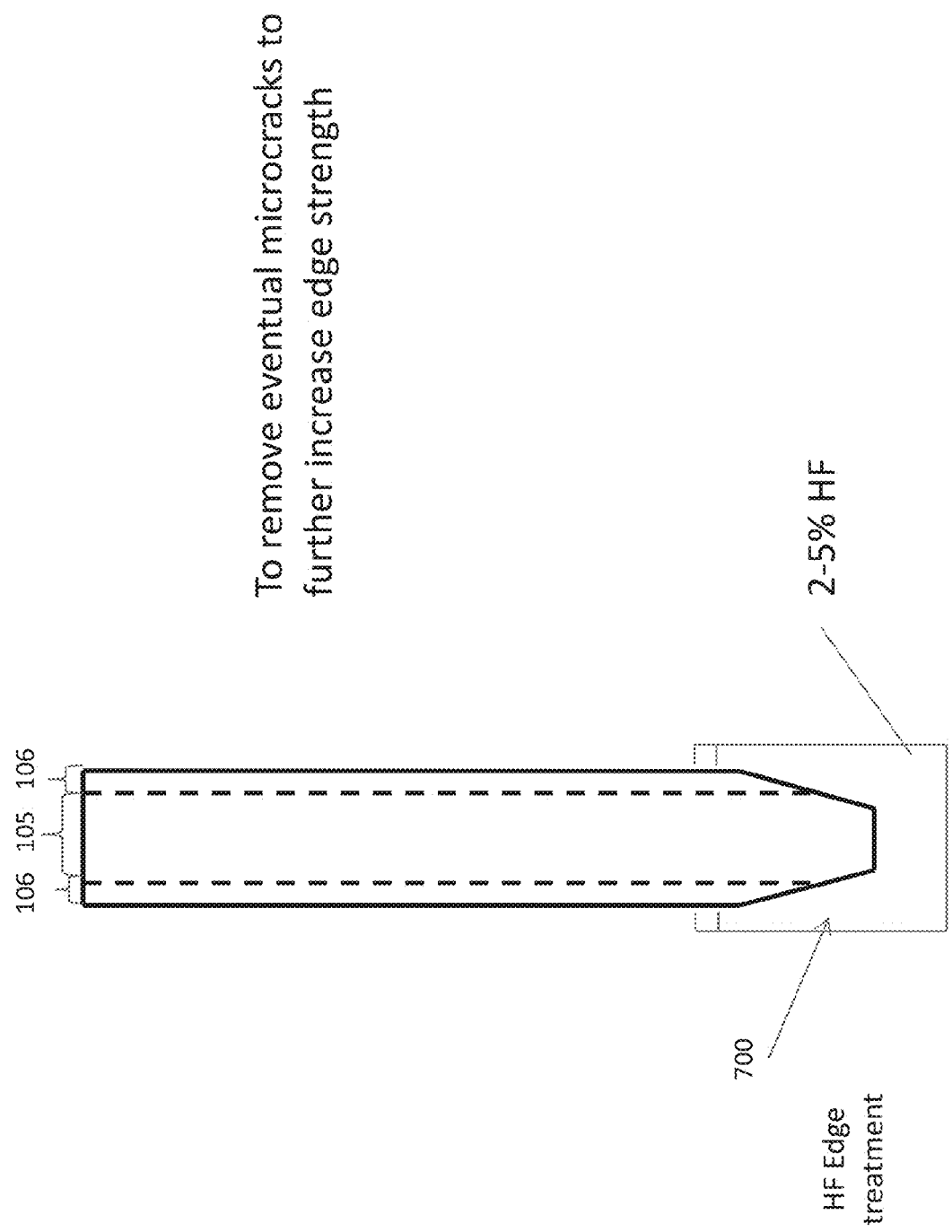

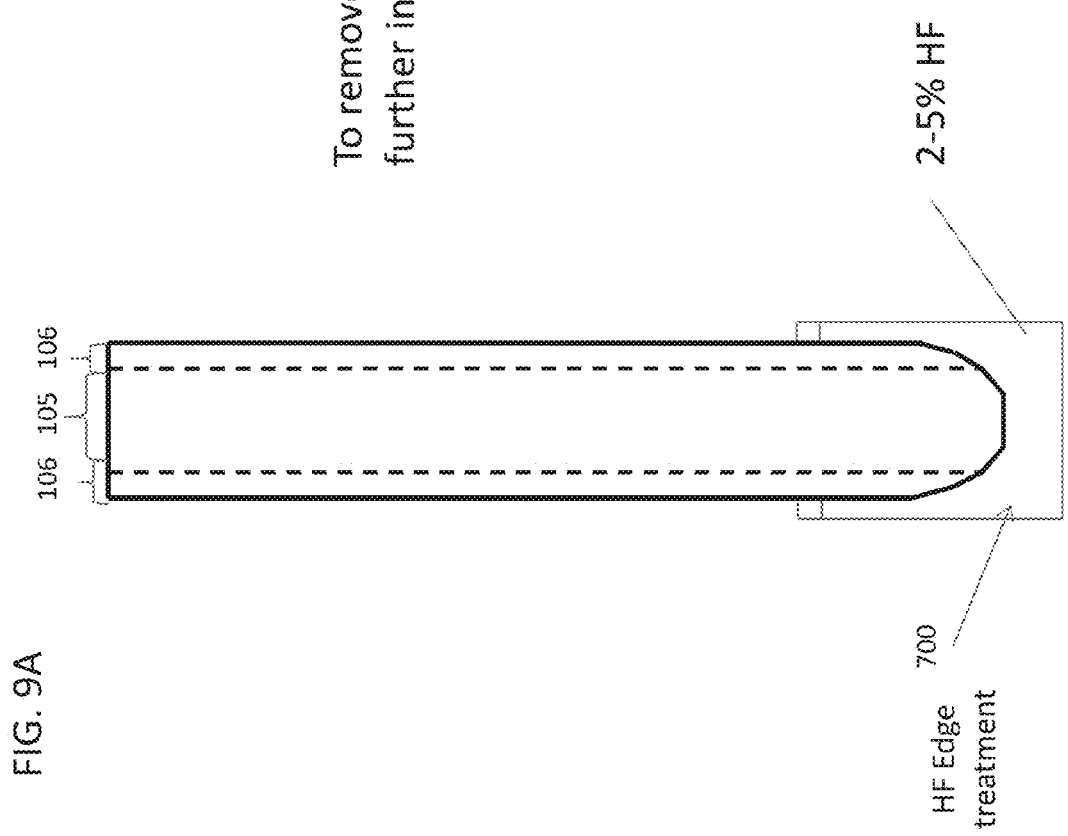

FIG. 10

| Edge Diagram | Description | Typical Application |
|---|---|---|
| Ground / Ground | Flat Ground | Silicone structural glazing with exposed edges |
| Polished / Ground | Flat Polish | Silicone structural glazing where edge condition is critical for aesthetic purposes |
| Ground | Ground Pencil Edge | Mirrors, Decorative furniture glass |
| Polished | Polished Pencil Edge | Mirrors, Decorative furniture glass |
| Specify Angle (27, 45 or 63°) / Ground | Ground Miter | Silicone structural glazing |
| 5° Angle / Polished | Bevel | Mirrors, Decorative furniture glass |
| Natural Cut / Seamed | Seamed Edges | Normal edge treatment for heat-treated glass |

Micrograph of mechanically ground edge

Chemically strengthening a protected stack of laser cut glass

LASER CUTTING STRENGTHENED GLASS

RELATED APPLICATIONS

This application claims priority to U.S. Provisional Patent Application Ser. No. 61/794,546, filed on Mar. 15, 2013, the disclosure of which is incorporated herein by reference in its entirety for all purposes. In addition, all publications and patent applications mentioned in this specification are herein incorporated by reference to the same extent as if each individual publication or patent application were specifically and individually indicated to be incorporated by reference.

FIELD OF THE DISCLOSURE

The present disclosure and inventions relate generally to methods for cutting strengthened glass, such as thermally strengthened glass, to methods for fabricating electrochromic composites, to methods for fabricating electrochromic devices, and to methods for fabricating insulated glass units. The disclosure and inventions also relate to cut thermally strengthened glass, to electrochromic composites, to electrochromic devices and to insulated glass units.

BACKGROUND

Strengthened glass can be used in a variety of applications that require higher strength than annealed glass. Examples of strengthened glass include chemically-strengthened and thermally-strengthened glass. Thermally-strengthened glass includes both heat-strengthened glass and fully-tempered glass. Chemically-strengthened glass and thermally-strengthened glass both have strained surface regions under compressive stress and an inner region under tensile stress. Chemically-strengthened glass can be manufactured by submerging untreated glass in a molten potassium salt bath. Typical temperatures are 450° C. to 550° C. and a prototypical salt is $KNO_3$. The sodium ions in the glass surface are exchanged with the potassium ions from the bath. This time dependent ion exchange process results in the formation of compressed surface regions on the glass. Thermally-strengthened glass is typically manufactured by heating annealed glass in a furnace to temperatures over 600° C. followed by rapidly cooling the glass. Such thermal treatment induces residual compressive stress at the surfaces of the glass and tensile stress in the center of the glass.

It is generally accepted in the art that thermally-strengthened glass cannot be cut after strengthening. For example, ASTM C1048-04 section 7.9 states, "Heat-treated flat glass cannot be cut after tempering. Fabrication altering the stress distribution, surface or edge shape, or dimensions must be performed before being heat treated."

As such, conventional methods for applications that require custom sizes for strengthened glass, especially thermally strengthened glass, typically cut the glass to the desired size prior to the strengthening process. After cutting, the custom sized glass substrates are strengthened. Processes for producing strengthened glass parts and products are mature, widespread, and able to meet the needs of many flat glass processors.

Processing many different sizes of glass sheet is less desirable for certain commercial applications, however, because machinery and applications may need to be customized for different sizes of glass sheet. Processing different sizes of glass sheets also decreases the efficiency and throughput for such commercial processes. Processing multiple sizes of glass sheets or substrates can be especially challenging for processes which include depositing coatings on the glass substrates such as vacuum sputtering, dip coating, or slot die coating. Additionally, processing glass prior to strengthening increases the chances of the glass breaking during earlier processing steps.

Despite such shortcomings, however, the art has not heretofore developed commercially meaningful glass fabrication approaches which would allow preparing and processing thermally strengthened glass in standardized, large-scale format with subsequent cutting to custom sizes for particular applications. In addition to the common industry understanding that cutting processes do not work for thermally strengthened glass, some industrial applications have additional technical challenges which make such an approach less certain. For example, coating glass substrates with thin films prior to strengthening may be undesirable for applications that include films that may be altered by process conditions associated with strengthening (e.g., where films may not withstand the temperatures used for thermal strengthening the glass).

Methods for cutting chemically-strengthened are known but typically have resulted in cut glass substrates with unacceptable edge defects. These edge defects are unacceptable for many applications because they greatly reduce the overall strength of the cut glass and can serve as nucleation points for larger cracks. Mechanical steps for processing the edges have been used (e.g., grinding the edges). These mechanical steps produce particles that are unacceptable for many applications. Notably, for example, the generated particles can cause damage to the surface of the glass and coatings formed on the surface of the glass.

U.S. Patent Publication No. 2011/0304899 to Kwak et al. ("Kwak et al.") acknowledges that tempered glass cannot be cut and that electrochromic devices cannot withstand the process conditions required to temper the glass. Kwak et al. address this problem by forming the electrochromic device on a piece of annealed glass followed by laminating the annealed glass to a piece of strengthened glass. However, the resultant device does not meet the strength requirements for many applications unless a very low thermal expansion glass such as borosilicate glass is used, and borosilicate glass is very expensive relative to other types of glass such as soda-lime glass.

Similarly, U.S. Patent Publication No. 2012/0182593 to Collins et al. discloses strengthening the glass substrate after cutting by laminating to a strengthened piece of glass. This suffers from the same limitations as Kwak et al.

Many different methods for cutting or scribing glass by using laser energy have been previously reported. A common approach is to apply laser energy to a piece of glass under conditions effective to ablate the glass along a desired cutting line. Ablation occurs when the energy being delivered to the glass is sufficient to vaporize the glass. This method typically produces undesirable cracks and debris, and because of the relatively wide heat affected area, the kerf width is not negligible. These drawbacks have prevented the successful application of this type of method to cutting strengthened glass.

U.S. Pat. No. 5,609,284 to Kondratenko and U.S. Pat. No. 6,787,732 to Xuan report kerf-free methods of cutting glass by thermal stress induced scribing. These methods have fewer drawbacks than the ablative methods but required the propagation of a crack along the cut line as well as a method to initiate the crack propagation. Relying on the propagation of a crack along a defect line is not preferred for cutting strengthened glass and especially for thermally strengthened glass, because cracks may propagate uncontrollably or simply reduce the strength of the cut edge making the cut piece of glass unusable.

U.S. Pat. No. 8,327,666 to Harvey et al. ("Harvey et al.") discloses using a nanosecond laser to cut chemically-strengthened glass in which the nanosecond laser is focused within the thickness of the glass in order to create a line of local defects which is referred to as the "laser induced damage line". This damage line allows the chemically strengthened glass to be cleaved by propagating a crack along this line. However, cutting thermally-strengthened glass is different from and significantly more difficult than cutting chemically strengthened glass (e.g., due to different compressive and tensile stress properties) and no details on the laser process conditions, evidence, or examples of cutting thermally-strengthened glass are provided. Harvey et al. discloses an example of cutting chemically strengthened glass with a 50 lam thick compression layer using a 355-nm nanosecond Nd—YAG laser. No enabling description or examples are provided for cutting thermally-strengthened glass or for cutting strengthened glass thicker than 2.0 mm. In fact, the disclosed approach would not be successfully applied to thermally-strengthened glass because the tensile stress in the center region of thermally-strengthened glass is much higher and defects or laser induced damage in this region could cause the glass to explode into small fragments. In addition, the propagation of a crack through thermally-strengthened glass would be much harder to control as the mean free path of crack propagation is much smaller than in chemically strengthened glass and the total stored energy is much greater. Finally, even if the laser induced damage line method occasionally yields successfully cut thermally-strengthened glass, the edges created by the crack propagation would be overpopulated with many micro cracks that would greatly reduce the strength of the cut glass and prevent it from passing standard ASTM strength tests required for building and transportation applications.

Generally, part of the laser energy applied to the glass is converted to heat. The amount of glass subject to the laser heat is typically called the heat affected zone. For laser ablation techniques, using a $CO_2$ laser for example, the heat affected zone is quite large and would not be useful for cutting strengthened glass as the strain created by the heat would cause the glass to break. Other techniques for cutting glass consist of creating a defect line or damage line along which the glass can be cleaved. As noted above, Harvey et al. disclose creating a "laser induced damage line" within the thickness of the glass. In order to do this, the laser is focused in the region of the glass under tensile stress and the energy provided by the laser is converted to thermal energy and locally modifies the glass thus creating a defect. Most of the examples provided by Harvey et al. are for glass compositions having a low coefficient of thermal expansion (CTE). Higher CTE glass would be expected to be much more difficult to cut using this method because the strain induced by the local heating could be enough to initiate the propagation of a crack in the tensile region of the glass, where Harvey et al. claims should be the location of the laser induced damage line. In contrast, the methods disclosed herein do not create a damage line in the center tensile region and generally avoid focusing the laser in the region of high tensile stress. It is desirable to avoid or minimize forming a damage line in the center tensile region of thermally-strengthened glass. The methods disclosed herein can address these problems.

Methods for cutting thermally-strengthened glass wherein at least some of the cut pieces of glass have good edge quality and high strength are desired. Methods for cutting chemically-strengthened glass with improved edge qualities wherein at least some of the cut pieces of glass have good edge quality and high strength are also desired. Methods for cutting composites or devices comprising a strengthened glass substrate (e.g., thermally-strengthened or chemically-strengthened glass substrate) wherein at least some of the cut pieces of composites or devices have good edge quality and high strength are also desired.

SUMMARY OF THE DISCLOSURE

Generally, the inventions described herein include methods for cutting strengthened glass, such as thermally-strengthened glass. The inventions also include methods for fabrication of composites (e.g., electrochromic composites), devices (e.g., electrochromic devices) and insulated glass units, in each case comprising strengthened glass, where such fabrication approaches include cutting a strengthened glass substrate (e.g., a thermally- or chemically-strengthened glass substrate). Further inventions are directed to a piece of cut strengthened glass, such as a piece of cut thermally strengthened glass. The inventions are also directed to composites (e.g., electrochromic composites), devices (e.g., electrochromic devices) and insulated glass units, in each case comprising strengthened glass.

In a first general aspect, inventions are directed to methods of cutting strengthened glass.

In a first approach of the first aspect, inventions are directed to methods of cutting thermally strengthened glass. Such methods include providing a thermally-strengthened glass substrate and applying laser energy to the thermally-strengthened glass substrate under conditions effective to cut the thermally-strengthened glass substrate. Applying laser energy to the thermally strengthened glass substrate can include forming a filamentation pattern defined by a series of regularly recurring filamentation traces in the thermally strengthened glass substrate. The series of filamentation traces can be substantially parallel to each other. The series of filamentation traces can be substantially perpendicular to a surface of the thermally strengthened glass substrate. The thermally strengthened glass substrate, in each case, can be a heat-strengthened glass substrate or a thermally tempered glass substrate. The method can further comprise fabricating or assembling an electrochromic composite or an electrochromic device using the cut piece of thermally strengthened glass. The methods can also include fabricating or assembling an insulated glass unit using the cut piece of thermally strengthened glass substrate.

In a second approach of the first aspect, inventions are directed to methods of cutting a strengthened glass substrate, such as a thermally strengthened glass substrate or a chemically strengthened glass substrate. Such methods include providing a strengthened glass substrate and applying laser energy to the strengthened glass substrate under conditions effective to cut the thermally-strengthened glass substrate by a protocol which includes forming a filamentation pattern defined by a series of regularly recurring filamentation traces in the strengthened glass substrate. The series of filamentation traces can be substantially parallel to each other. The series of filamentation traces can be substantially perpendicular to a surface of the strengthened glass substrate. A thermally strengthened glass substrate, in each case, can be a heat-strengthened glass substrate or a thermally tempered glass substrate. The method can further comprise fabricating or assembling an electrochromic composite or an electrochromic device using the cut piece of strengthened glass.

The methods can also include fabricating or assembling an insulated glass unit using the cut piece of strengthened glass substrate.

In a third approach of the first aspect, inventions are directed to methods of cutting a strengthened glass substrate, such as a thermally strengthened glass substrate or a chemically strengthened glass substrate. Such methods include providing a strengthened glass substrate, applying laser energy to the strengthened glass substrate under conditions effective to cut the strengthened glass substrate, and treating the cut edges to increase the strength of the glass substrate. Treating the cut edges can comprise applying laser energy to cut the edge at an obtuse angle relative to a surface of the strengthened glass substrate to form a chamfered edge. Treating the cut edges can comprise a chemical treatment. Treating the cut edges can comprise applying a coating to the cut edge. A coating on the cut edge can comprise a metal, an oxide, or a polymer. Applying laser energy to the strengthened glass substrate can include forming a filamentation pattern defined by a series of regularly recurring filamentation traces in the strengthened glass substrate. The series of filamentation traces can be substantially parallel to each other. The series of filamentation traces can be substantially perpendicular to a surface of the strengthened glass substrate. A thermally strengthened glass substrate, in each case, can be a heat-strengthened glass substrate or a thermally tempered glass substrate. The method can further comprise fabricating or assembling an electrochromic composite or an electrochromic device using the cut piece of strengthened glass. The methods can also include fabricating or assembling an insulated glass unit using the cut piece of strengthened glass substrate.

In the methods of the first general aspect, including the methods of any of the first, second or third approaches thereof, conditions effective to cut the strengthened glass substrate can include:

(a) focusing laser energy at a first position on or in proximity of a first surface of the strengthened glass substrate, (b) pulsing the focused laser energy for a pulse duration ranging from about 10 femtoseconds to about 100 picoseconds at a pulse frequency ranging from about 100 kHz to about 100 MHz, the pulsed laser having a pulse energy of about 1 micro Joule ($\mu J$) to about 100 $\mu J$, and having a wavelength of about 250 nm to about 1100 nm, (c) translating the focal point of the pulsed focused laser energy relative to the first surface, (d) repeating steps (b) and (c) to form a filamentation pattern defined by a series of regularly recurring substantially parallel filamentation traces, and (e) separating the strengthened glass substrate along the filamentation pattern to form two or more cut pieces of the strengthened glass substrate.

In a second general aspect, the inventions are directed to methods for fabricating two or more electrochromic composites. The methods include providing an electrochromic composite comprising a strengthened glass substrate having a first surface and an opposing second surface, an electrically conductive layer supported on the first surface of the strengthened glass substrate, and an electrochromic layer in electronic communication with the electrically conductive layer; and applying laser energy to the strengthened glass substrate under conditions effective to cut the strengthened glass substrate to form two or more electrochromic composites. The electrically conductive layer can include a metal or a metal oxide. The electrically conductive layer can include a transparent conductive material. The electrochromic layer can be an anodic electrochromic layer. The electrochromic layer can be a cathodic electrochromic layer. The electrochromic composite can be provided as a mother glass composite. The electrochromic composite can be provided as a mother glass composite comprising an array of two or more spatially discrete electrochromic composites, each comprising a corresponding spatially discrete portion of the strengthened glass substrate. Laser energy can be applied to the strengthened glass substrate to cut the mother glass composite and separate two or more spatially discrete electrochromic composites. In preferred approaches of the second general aspect of the invention, the strengthened glass substrate can be cut according to the methods of the first general aspect of the invention, including any of the first, second or third approaches thereof, as described generally above, and more specifically hereafter. The method can further comprise fabricating or assembling an electrochromic device using one or more of the formed electrochromic composites. The methods can also include fabricating or assembling an insulated glass unit using one or more of the formed electrochromic composites.

In a third general aspect, the inventions are directed to methods for fabricating two or more electrochromic devices. The methods include providing an electrochromic device comprising a strengthened glass substrate and applying laser energy to the strengthened glass substrate under conditions effective to cut the strengthened glass substrate to form two or more electrochromic devices. The electrochromic device can include two electrically conductive layers and an electrochromic cell in electronic communication with the electrically conductive layers, where the electrically conductive layers and electrochromic cell are supported, directly or indirectly, on a surface of the strengthened glass substrate. The electrochromic cell can include an anode, a cathode, and an ion conductor in electronic communication with the anode and cathode with at least one of the anode or cathode comprising an electrochromic material. The electrochromic device can be provided as a mother glass composite. The mother glass composite can comprise an array of two or more spatially discrete electrochromic devices, each comprising a corresponding spatially discrete portion of the strengthened glass substrate. Laser energy can be applied to the strengthened glass substrate to cut the mother glass composite and separate two or more spatially discrete electrochromic composites. In preferred approaches of the third general aspect of the invention, the strengthened glass substrate can be cut according to the methods of the first general aspect of the invention, including any of the first, second or third approaches thereof, as described generally above, and more specifically hereafter. The methods can also include fabricating or assembling an insulated glass unit using one or more of the formed electrochromic devices.

In a fourth general aspect, the inventions are directed to methods for fabricating an insulated glass unit. The methods include providing a first mother glass comprising a first strengthened glass substrate; applying laser energy to the first strengthened glass substrate under conditions effective to cut the strengthened glass substrate to form a first glass lite; providing a second glass lite; and assembling the first glass lite and the second glass lite into an insulated glass unit. The methods can include providing a second mother glass comprising a second strengthened glass substrate and cutting the second strengthened glass substrate to form the second glass lite. The first and/or second strengthened glass substrate can be independently selected from thermally-strengthened glass substrates or chemically strengthened glass substrates. The first and second strengthened glass substrates can be provided as a component of an electrochromic composite, or as a component of an electrochromic device. The mother glass composite can comprise an array of two or more spatially discrete electrochromic composites or spatially discrete electrochromic devices, each comprising a corresponding spatially discrete portion of the strengthened glass substrate. Laser energy can be applied to the strengthened glass substrate to cut the mother glass composite and separate two or more spatially discrete electrochromic composites or electrochromic devices. In preferred approaches of the fourth general aspect of the invention, the strengthened glass substrate can be cut according to the methods of the first general aspect of the invention, including any of the first, second or third approaches thereof, as described generally above, and more specifically hereafter.

In a fifth general aspect, the inventions are directed to a piece of cut strengthened glass.

In a first approach of the fifth general aspect, the inventions are directed to a piece of cut thermally-strengthened glass. The piece of cut glass includes a thermally-strengthened glass substrate having a first surface, an opposing second surface, and a peripheral edge between the first surface and the second surface with the edge having indicia of a laser filamentation cutting process. The thermally strengthened glass substrate can include a heat treated glass substrate or a thermally-tempered glass substrate. The strengthened glass substrate can be soda-lime glass.

In a second approach of the fifth general aspect, the inventions are directed to a piece of cut strengthened glass which comprises a strengthened glass substrate having a first surface, an opposing second surface, and a peripheral edge between the first surface and the second surface with the peripheral edge having indicia of a laser filamentation cutting process, and a treated edge surface. The treated edge surface can be a chamfered edge surface. The treated edge surface can be a chamfered edge at an obtuse angle relative to a surface of the strengthened glass substrate. The treated edge surface can include a surface having a low surface roughness. The treated edge surface can comprise a coating over the cut edge. A coating on the cut edge can comprise a metal, an oxide, or a polymer. The strengthened glass substrate can include a thermally strengthened glass substrate or a chemically strengthened glass substrate. The strengthened glass substrate can be soda-lime glass.

For the piece of cut strengthened glass of the fifth general aspect, including the cut glass piece of any of the first or second approaches thereof, indicia of the laser filamentation cutting process can include a filamentation pattern defined by a series of regularly recurring filamentation traces. The series of filamentation traces can be substantially parallel to each other. The series of filamentation traces can be substantially perpendicular to a surface of the strengthened glass substrate. The series of filamentation traces can define a plurality of the filamentation traces having a width ranging from about 0.5 microns (μm) to about 10 μm. The adjacent filamentation traces can be separated by an average distance ranging from about 1 μm to about 30 μm.

In a sixth general aspect, the inventions are directed to an electrochromic composite. Such electrochromic composites includes a strengthened glass substrate having a first surface, an opposing second surface, and a peripheral edge between the first surface and second surface, the edge having indicia of a laser filamentation cutting process; an electrically conductive layer supported on the first surface of the strengthened glass substrate; and an electrochromic layer in electronic communication with the electrically conductive layer. The strengthened glass substrate can include a chemically-strengthened glass or thermally-strengthened glass. The strengthened glass substrate can be soda-lime glass. The indicia of the laser filamentation cutting process can include a filamentation pattern defined by a series of regularly recurring filamentation traces. The series of filamentation traces can be substantially parallel to each other. The series of regularly recurring filamentation traces can be oriented substantially perpendicular to the first and second surfaces of the strengthened glass substrate. A plurality of the filamentation traces can have a width ranging from about 0.5 μm to about 10 μm. The adjacent filamentation traces can be separated by an average distance ranging from about 1 μm to about 30 μm.

In a seventh general aspect, the inventions are directed to electrochromic devices. The electrochromic devices include at least one strengthened glass substrate having a first surface, an opposing second surface and a peripheral edge between the first surface and second surface, the peripheral edge having indicia of a laser filamentation cutting process. The electrochromic device can include two electrically conductive layers and an electrochromic cell in electronic communication with the electrically conductive layers, the electrically conductive layers and electrochromic cell being supported, directly or indirectly, on the first surface or second surface of the strengthened glass substrate. The electrochromic devices can also include: a first glass substrate having a first surface and an opposing second surface, a first electrically conductive layer supported on the first surface of the first glass substrate, and an electrochromic anodic layer in electronic communication with the first electrically conductive layer. The electrochromic devices can include a second glass substrate having a first surface and an opposing second surface, a second electrically conductive layer supported on the second surface of the second glass substrate, and an electrochromic cathodic layer in electronic communication with the second electrically conductive layer. The electrochromic devices can include an ion-conducting material in electronic communication with each of the electrochromic anodic layer and the electrochromic cathodic layer. The indicia of the laser filamentation cutting process can include a filamentation pattern defined by a series of regularly recurring filamentation traces. The series of filamentation traces can be substantially parallel to each other. The series of regularly recurring filamentation traces can be oriented substantially perpendicular to the first and second surfaces of the strengthened glass substrate. A plurality of the filamentation traces can have a width ranging from about 0.5 μm to about 10 μm. The adjacent filamentation traces can be separated by an average distance ranging from about 1 μm to about 30 μm.

In an eighth general aspect, the inventions are directed to insulated glass units. The insulated glass units include a first lite comprising a strengthened glass substrate having a first surface, an opposing second surface and a first peripheral edge between the first surface and second surface. The insulated glass units also include a second lite comprising a glass substrate having a first surface, an opposing second surface, and a second peripheral edge between the first surface and second surface and a spacer element providing spatial separation between the first glass lite and the second glass lite. At least one of first peripheral edge or the second peripheral edge has indicia of a laser filamentation cutting process. The second lite can be a strengthened glass substrate. The strengthened glass substrates can be chemically-strengthened or thermally-strengthened. The strengthened glass substrate can be soda-lime glass. The indicia of the laser filamentation cutting process can include a filamentation pattern defined by a series of regularly recurring filamentation traces. The series of filamentation traces can be substantially parallel to each other. The series of regularly recurring filamentation traces can be oriented substantially perpendicular to the first and second surfaces of the strengthened glass substrate. A plurality of the filamentation traces can have a width ranging from about 0.5 µm to about 10 µm. The adjacent filamentation traces can be separated by an average distance ranging from about 1 µm to about 30 µm.

BRIEF DESCRIPTION OF THE DRAWINGS

A better understanding of the features and advantages of the present disclosure will be obtained by reference to the following detailed description that sets forth illustrative embodiments, in which the principles of the disclosure are utilized, and the accompanying drawings.

FIGS. 8-8A are schematic illustrations of polymeric edge treatments of glass substrates in accordance with embodiments.

FIGS. 9-9A are schematic illustrations of chemical edge treatments of glass substrates in accordance with embodiments.

FIG. 10 is an illustration of various modifications to an edge.

DETAILED DESCRIPTION

The inventions described herein enable cutting of thermally-strengthened glass and, independently, the fabrication of composites (e.g., electrochromic composites), devices (e.g., electrochromic devices) and insulated glass units comprising strengthened glass, where such fabrication approaches include cutting a strengthened glass substrate (e.g., a thermally- or chemically-strengthened glass substrate). Accordingly, methods for cutting strengthened glass using a laser are disclosed herein. Preferably, a laser filamentation process can be used to cut a strengthened glass substrate. Cut strengthened glass, and composites and devices comprising cut strengthened glass, are also disclosed herein, each including strengthened glass having a cut edge with indicia from the laser cutting processes disclosed herein. Examples of strengthened glass include chemically-strengthened glass and thermally-strengthened glass. A composite or device can include layers, films, or coatings, in each case formed on or supported by (in each case, directly or indirectly) the strengthened glass. The material formed on the strengthened glass substrate (e.g., as a layer, film or coating) can include materials that are sensitive to glass strengthening processes. In preferred embodiments, the material formed on the strengthened glass substrate can include an electrochromic material.

Figure 1A:
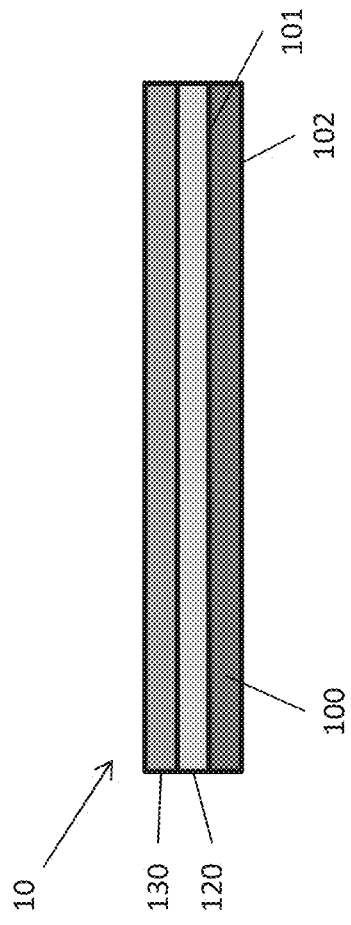
FIG. 1A illustrates an example of an electrochromic composite.
Figure 1B:
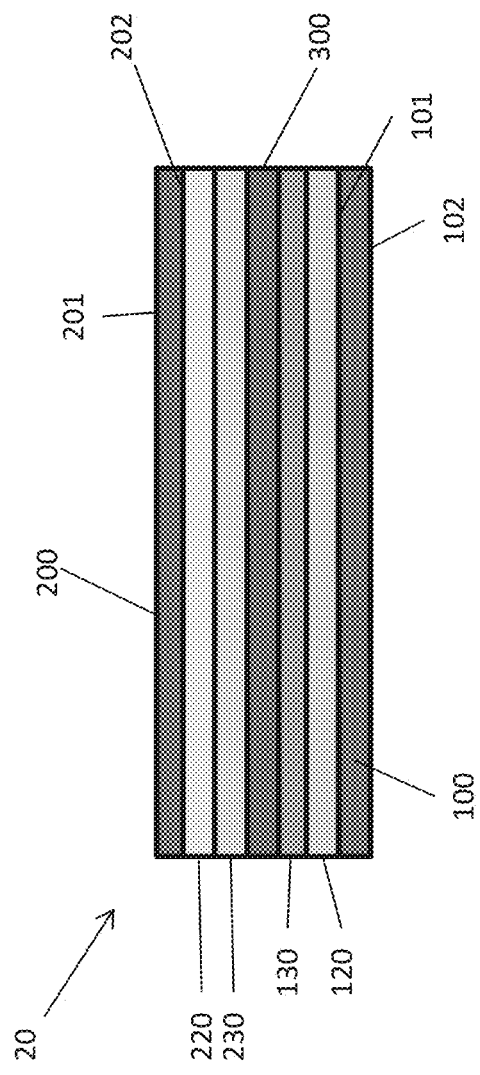
FIG. 1B illustrates an example of an electrochromic device.

The strengthened glass can support an electrochromic material. Electrochromic materials are materials that have a transmittance over a defined range of wavelengths that changes upon application of an applied potential. The optical or thermal properties of the electrochromic material, including transmittance, can change with an applied voltage. The transmittance of electrochromic materials can change for various wavelengths of light, such as infrared (IR) wavelengths, ultraviolet (UV) wavelengths, visible light, and combinations of these, upon application of an applied potential. With reference to FIG. 1A and FIG. 1B, a strengthened glass substrate 100, 200 can be a component of a device 20 or a composite 10, such as an electrochromic device or an electrochromic composite, in each case comprising an electrochromic material (e.g., depicted as an electrochromic layer 130, 230). An electrochromic device 20 can include an electrochromic cell. An electrochromic cell can be an electrochemical cell comprising a cathode, an ion conductor, and an anode, where at least one of the cathode or anode comprises an electrochromic material. Hence, an electrochromic cell is a type of electrochemical cell that has optical or thermal properties that can change based on an applied voltage between the anode and cathode. An electrochromic composite 10 can include one or more layers formed on or supported by (each, directly or indirectly) a strengthened glass substrate 100, where at least one of the layers comprises an electrochromic material (e.g., depicted as an electrochromic layer 130). Hence, an electrochromic composite can be an electrochromic half-cell—for example, comprising at least one of an electrochromic anodic material, or alternatively an electrochromic cathodic material. An electrochromic film can be a component of an electrochromic cell or half cell, such as an electrochromic device 20 or an electrochromic composite 10. Electrochromic composites and electrochromic devices can also include one or more electrically conductive layers 120, 220 supported on glass substrates 100, 200, respectively, and in electronic communication with electrochromic layers 130, 230, respectively. In some embodiments the electrochromic material can be active for modulating visual wavelengths of light. In some embodiments the electrochromic material can be active for modulating IR wavelengths. In some embodiments the electrochromic material can be active for modulating UV wavelengths.

Methods for cutting thermally-strengthened glass are disclosed herein. The thermally-strengthened glass substrate can support an electrochromic film, for example, as a component of an electrochromic device or an electrochromic composite.

Methods for cutting thermally-strengthened glass with improved edge quality are disclosed herein. Methods disclosed previously for cutting thermally-strengthened glass, consisting of propagating a crack along a damage line in the glass would result in poor edge quality and low strength.

Methods for cutting chemically-strengthened glass—for example, as a component of an electrochromic device or electrochromic composite are disclosed herein. Methods which preferably provide a cut chemically strengthened glass with improved edge quality are disclosed herein. Conventional methods for cutting chemically strengthened glass substrates typically result in poor edge quality and cracks on the cut edges which reduce the strength of the cut piece of glass.

The methods disclosed herein can be used to cut strengthened glass by itself or strengthened glass having one or more layers or coatings (a composite). In some embodiments such a composite is cut using the methods disclosed herein. The composite can be an electrochromic composite, and can, for example, include a partially-fabricated electrochromic device. In some embodiments an electrochromic device comprising a strengthened glass substrate can be cut using the methods disclosed herein. In some embodiments an integrated glass unit comprising a strengthened glass can be assembled from the cut strengthened glass substrate disclosed herein.

Benefits of the present inventions are particularly applicable for applications that involve forming films, coatings, or layers on strengthened glass substrates that are sensitive to high temperatures or the chemical strengthening process. Benefits are also applicable for applications involving composites or devices comprising glass substrates that are sensitive to high temperatures or the chemical strengthening process.

Conventional processes for coating and processing glass, such as sputter coating, slot coating, dip coating, chemical vapor deposition at atmospheric pressure, roll coating, substrate transport, substrate registration, and lamination can achieve higher utilizations and yields when a single substrate size is used. It is thus advantageous to manufacture coated glass components for automotive, residential and commercial architectural glazing applications using one or a small number of substrate sizes. The methods disclosed herein allow for processing larger substrate sizes with significantly increased throughput, which decreases manufacturing costs and allows for quicker turnaround for customer orders.

The methods and devices disclosed herein are applicable to many different applications, generally including for example building applications, automotive applications, and electronics applications. The methods and devices are also applicable, more specifically, for electrochromic devices such as active windows, polymer dispersed liquid crystal devices, solar cells, building integrated photovoltaics, flat panel displays, and suspended particle devices. Heat-strengthened glass can be used in building applications. A variety of sizes and shapes of glass are used in building applications. Custom sizes are often required for glass used for building applications. Generally, building applications require strengthened glass such as thermally strengthened glass.

The ability to cut strengthened glass, such as thermally strengthened glass, allows for processing steps to be performed on strengthened glass instead of un-strengthened glass while maintaining a high throughput. The increased mechanical strength of the strengthened glass can reduce the chance of breakage or damage to the glass during subsequent processing, fabrication, or handling steps. The additional strength can also enable processing and fabrication steps that were not acceptable for un-strengthened glass substrates.

The methods disclosed herein can be used for any applications where glass that is stronger than annealed glass is used. Strengthened glass includes chemically-strengthened glass and thermally-strengthened glass. Thermally-strengthened glass includes heat-strengthened glass, tempered glass, and fully tempered glass. ASTM standards provide guidelines for the physical properties of various types of strengthened glass.

Figure 2A:
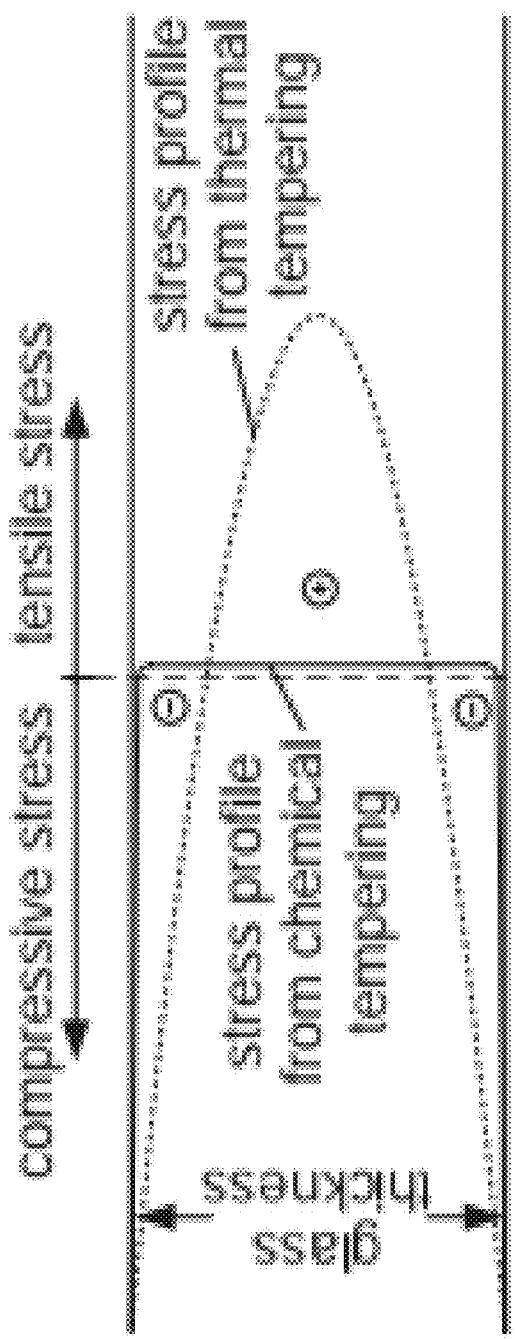
FIG. 2A illustrates an example of a strain profile for chemically-strengthened glass and a thermally-strengthened glass.

Thermally-strengthened glass is typically manufactured by heating annealed glass to temperatures higher than about 600° C. followed by rapidly cooling the glass surfaces. This thermal treatment induces a stress profile in the glass with a region of compression at the surfaces and an area under tensile stress at the center of the glass, as illustrated in FIG. 2A (thermally tempered glass) and FIG. 2B (heat-strengthened glass). As illustrated in FIG. 2A, the transition between the surface compression and center tension is more gradual in thermally-strengthened glass versus chemically-strengthened glass. The surface compression in thermally-strengthened glass is not limited by ionic diffusion but rather thermal diffusion during the cooling step, and extends much deeper than the surface compression in chemically-strengthened glass. The compressed surface regions in thermally-strengthened glass typically each occupy about 20% of the glass thickness.

Thermally-strengthened glass includes heat-strengthened and fully tempered glass. According to ASTM C 1048-04, fully tempered glass is required to have a minimum surface compression of 69 MPa (10,000 psi) or an edge compression of not less than 67 MPa (9,700 psi). Fully tempered glass typically has a residual compressive surface stress of between about 80 MPa and 150 MPa. Fully tempered glass typically has a surface compression layer of around 20% of the total glass thickness.

Figure 2B:
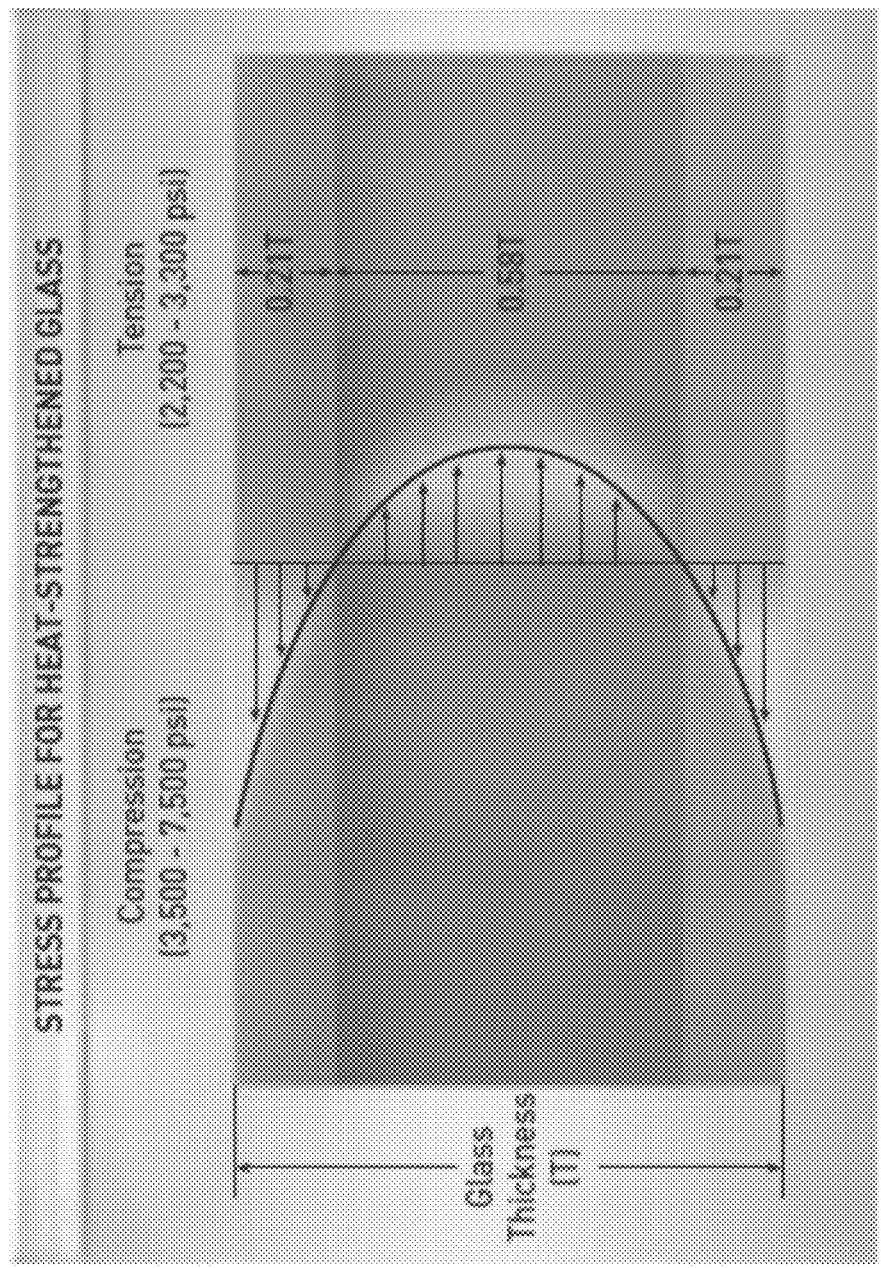
FIG. 2B illustrates an example of a strain profile for a heat-strengthened glass.

Heat-strengthened glass is produced using a similar process to fully tempered glass but with a slower cooling rate. ASTM C 1048-04 requires that heat-strengthened glass has a residual compressive surface stress between 24 MPa (3,500 psi) and 52 MPa (7,500 psi). Heat-strengthened glass typically has a surface compression layer of around 20% of the total glass thickness as shown in FIG. 2B. For example the compression layers at the surface of heat-strengthened glass are about 640 μm for 3.2 mm glass, about 440 μm for 2.2 mm glass, and about 320 μm for 1.6 mm glass. Heat-strengthened glass, as used herein, can also apply to thermally-strengthened glass having a residual compressive surface stress between 24 MPa and 67 MPa.

Chemically-strengthened glass is typically manufactured by ion exchange in a molten salt bath. The ion diffusion is typically limited to the immediate surface of the glass. The diffusion of larger ions into the glass surfaces causes compression in the surface regions of the glass. The depth of the compressively stressed layer in chemically strengthened glass is a function of the amount of the temperature of the salt bath as well as the amount of time the glass was immerged in the bath. Typically, the depth of layer is limited to around 20 μm to 200 μm. As illustrated in FIG. 2A, the stress profile in chemically-strengthened glass exhibits a sharp transition between the compressively stressed surface and the center region under tensile stress.

For chemical strengthened glass, cutting and drilling of the glass remains possible but can adversely affect the edge strength and overall strength of the glass. Chemically-strengthened glass is rarely used for architectural applications. In some cases chemically-strengthened glass can be used for special geometries where usual tempering cannot be used.

FIG. 2A illustrates the cross-sectional stress profile of a chemically-strengthened piece of glass and a thermally-strengthened piece of glass. The surface regions of compressive stress are responsible for improved resistance against impact, bending, thermal shock, and scratches. The inner region of tensile stress, on the other hand, is where cracks propagate and cause strengthened glass to fracture. It is significant that the tensile stress in the center region is much greater in the thermally-strengthened glass than in the chemically-strengthened glass. Therefore, thermally-strengthened glass is more vulnerable to damage induced in the center tensile region than chemically-strengthened glass. If the induced damage is significant enough, a crack will propagate rapidly through the glass. The crack can propagate in random directions and at speeds of over 1000 m/s releasing part of the stored elastic energy in creating fracture surfaces. Qualitatively, it is clear that there is significantly more stored energy in thermally tempered glass than in chemically strengthened glass because the number of fragments, and hence fracture surfaces obtained after shattering, is much higher for thermally tempered glass. The stored energy can be approximated theoretically by the following equation: $U=(6 \cdot V \cdot \sigma^2)/E$, where V is the volume of the glass, σ is the center tension in the glass and E is Young's modulus for glass. This equation demonstrates the significance of the maximal tensile stress in the center region. This equation also shows that increasing the thickness of the glass linearly increases the stored energy. Therefore, thermally-strengthened glass is much more difficult to successfully cut without shattering and much more difficult to successfully cut yielding a piece that is high strength, as compared to chemically strengthened glass.

Figure 3:
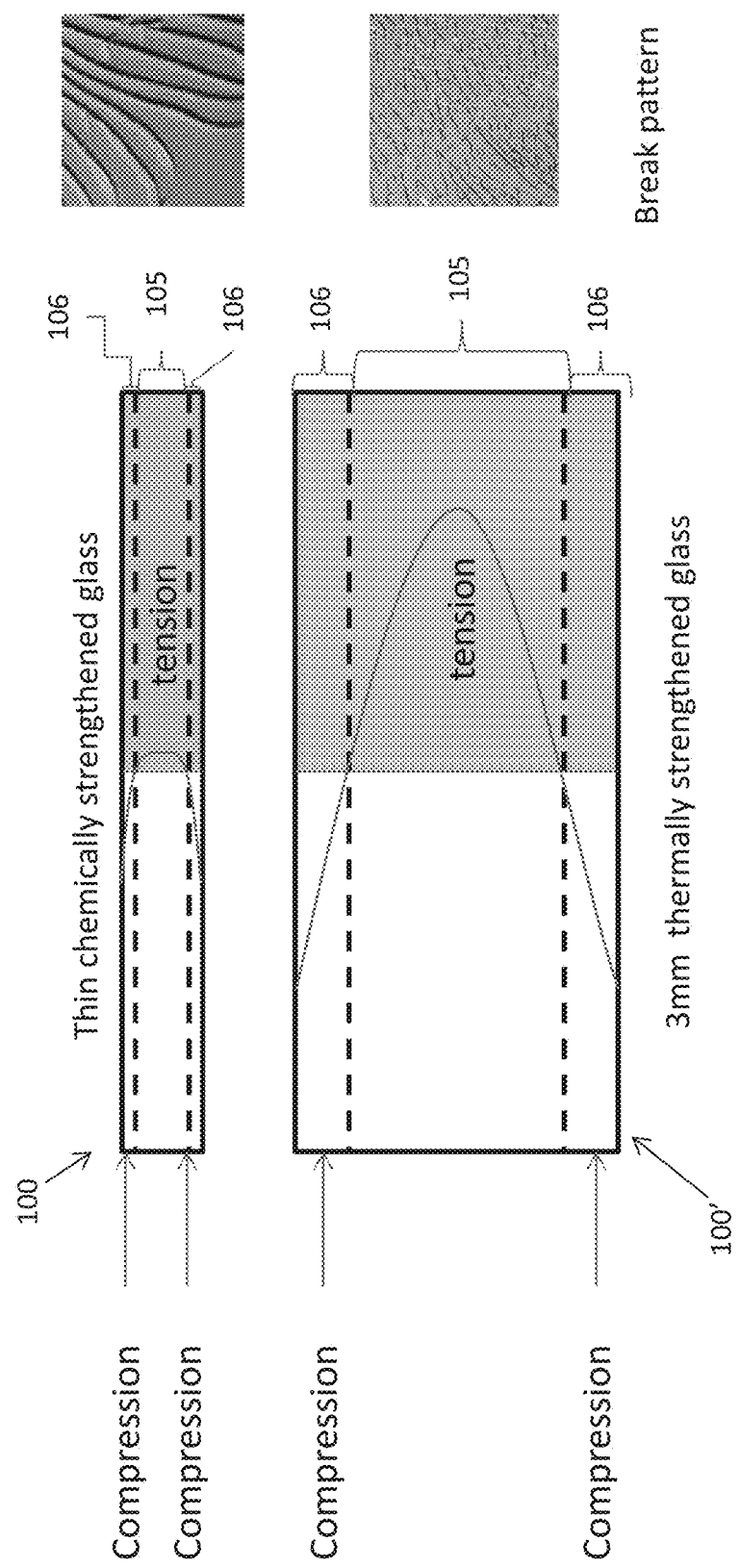
FIG. 3 illustrates an example of a strain profile for a thin chemically-strengthened glass and a thicker thermally strengthened glass along with break patterns for each glass.

The different break patterns between chemically-strengthened and thermally-strengthened glass also provide evidence of the much greater stored energy in thermally-strengthened glass. FIG. 3 illustrates a cross-sectional stress profile, including a central tensile stress region 105 and a peripheral compressive stress region 106, for a thin (e.g., 1 mm) piece of chemically-strengthened glass 100 and a thicker (e.g., 3 mm) piece of thermally-strengthened glass 100', along with a respective break pattern for each of the chemically-strengthened and thermally-strengthened glass. The thermally-strengthened glass has a much higher level of stored energy and much larger tension force in the central tensile stress region 105 (as represented between dotted lines) of the glass. The different break patterns highlight the different amounts of stored energy. The break pattern for the chemically-strengthened glass has larger cracks and patterns than the break pattern for the thermally-strengthened glass. The break pattern in the thermally-strengthened glass has much smaller breaks, which is indicative of the much higher level of stored energy in the thicker thermally-strengthened glass versus the thinner chemically-strengthened glass.

In the present invention, laser energy can be applied to the strengthened glass substrate under conditions effective to cut the strengthened glass substrate. In some embodiments the laser energy is focused on or in proximity of a first surface of the strengthened glass substrate under conditions effective to cut the thermally-strengthened glass substrate. Conditions effective to cut the strengthened glass substrate can include conditions defined by the pulse energy, pulse rate, pulse duration, laser wavelength, focus depth, pulse train frequency, number of pulses in a pulse train, frequency of repeating the pulse train, laser beam width, distance between laser pulses on the glass substrate, and others.

In some embodiments a laser filamentation process is used to cut the strengthened glass substrates as disclosed herein. Publication No. WO 2012/006736 to Filaser Inc. ("Filaser") discloses a laser filamentation process for cutting glass, the disclosure of which is incorporated herein in its entirety. Filaser does not disclose cutting strengthened glass.

The laser filamentation process can include irradiating the substrate with a focused laser beam. Laser filamentation can include the propagation of an ultra-short, high peak power laser pulse that is able to propagate over extended distances while keeping a narrow beam width. Without being bound by theory not explicitly recited in the claims, the fundamental physics of laser filamentation involves the balancing actions between Kerr self-focusing of the laser pulse and self-de-focusing due to the generated weak plasma. In order to observe a laser filament in a given media, the peak power of the laser pulse should be higher than a critical power Pc, at which the index of refraction of the material interacting with the core part of the pulse increases enough to compensate for linear diffraction. Furthermore, to sustain a filament over a long distance, the power of the laser pulse should additionally compensate for the nonlinear diffraction caused by the ionization of the optical medium. With an appropriately chosen laser power, pulse length, and beam direction, a single pulse focused in proximity to or within a glass substrate can produce a filament trace perpendicular to the surface of the glass. The filament trace can extend through the entire thickness or only a certain percentage of the thickness, depending on the laser settings. For example, with an IFRIT or Cyber laser producing laser light at 780 nm with a pulse duration of 172 femtoseconds, a single pulse of around 15 μJ to 40 μJ can produce a laser filament in 0.7 mm thick display glass.

The critical power to be used to produce a self-focusing pulse can be calculated and is a function of the wavelength, the index of refraction of the optical medium and the Kerr non-liner index of refraction. Using laser filamentation to cut glass can greatly increase glass cutting speeds, for example to around 500 mm/s or higher. An array of filamentary modification lines can be produced using a high pulse rate and moving the substrate relative to the laser beam. The array of filamentary modifications can be produced with a period on the micron scale, along which the glass substrate can be cleaved by applying a slight mechanical force. The spacing and the depth of the laser filament induced modification can be optimized based on the glass thickness and composition. In the context of glass cutting, the characteristics of the filament traces, such as spacing, depth, and width have a direct impact on the amount of force necessary to separate the pieces of glass as well as the quality of the cut edge, and therefore the strength of the cut piece of glass. For display glass of 0.7 mm thick, filamentary damage traces having a diameter of a few microns and spaced with a 10 µm period is sufficient to allow for easy cleaving. Longer periods can also work but cleaving can be more difficult. For improved edge strength and edge quality a smaller spacing could in fact be necessary.

A laser filament produced in glass can create a small filament volume or self-focal volume wherein the glass is ionized. This volume can be very narrow, e.g. on the order of a few microns or less. The extremely narrow volume can be small enough to prevent strengthened glass, such as thermally-strengthened glass, from exploding during the laser cutting process. The laser parameters can be selected to create a filament within the substrate. The filaments can be used to form an array of lines defining a path for cleaving the substrate. After irradiating the substrate with laser energy, the substrate can be "cut" or fully separated by applying modest mechanical force. The laser process conditions described herein can be selected and optimized to cut the strengthened glass substrate. The laser settings can be tuned to produce an array of filament traces in the strengthened glass that allow for cleaving the glass without exploding and ensuring that the cut pieces of glass meet specific strength standards. One or more pulses of laser energy can be used to create each filament.

Figure 4:
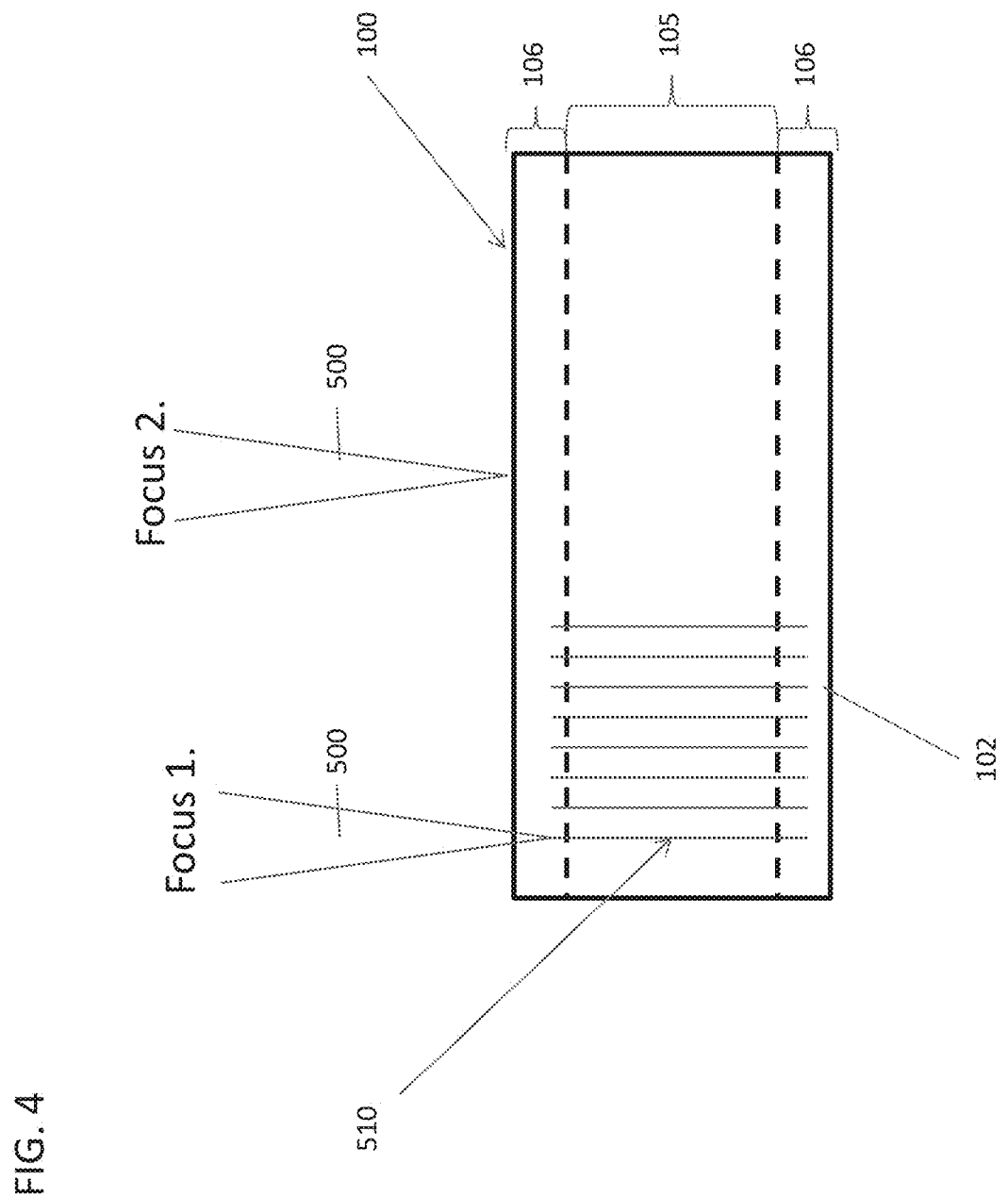
FIG. 4 illustrates a schematic of laser focus positions in accordance with some embodiments.

FIG. 4 illustrates a schematic of laser focus positions on a strengthened glass substrate 100 in accordance with some embodiments. FIG. 4 illustrates an incident laser 500 having first focal position, Focus 1, which is within a compressively strained region 106 of the strengthened glass substrate 100. Alternatively, an incident laser 500 can have a second focal position, Focus 2, which is illustrated as adjacent to a first surface 101 of the strengthened glass substrate 100. The focal points illustrated by Focus 1 and Focus 2 can be used to create a filament of laser light 510 in the strengthened glass substrate as shown in FIG. 4.

In some embodiments the laser can be focused in a compressively stressed region (e.g., 106 as depicted in FIG. 4) of the strengthened glass. Generally, it is desirable to avoid focusing the laser in the tensile strained region (e.g., 105 as depicted in FIG. 4) of the glass substrate to avoid creating a defect or crack that can propagate uncontrollably. In some embodiments the laser can be focused on a surface (101, 102 as depicted in FIG. 4) of the strengthened glass or in proximity of the surface (101, 102 as depicted in FIG. 4) of the strengthened glass. In some embodiments the laser can be focused on films or layers on the surface of the strengthened glass.

Figure 5:
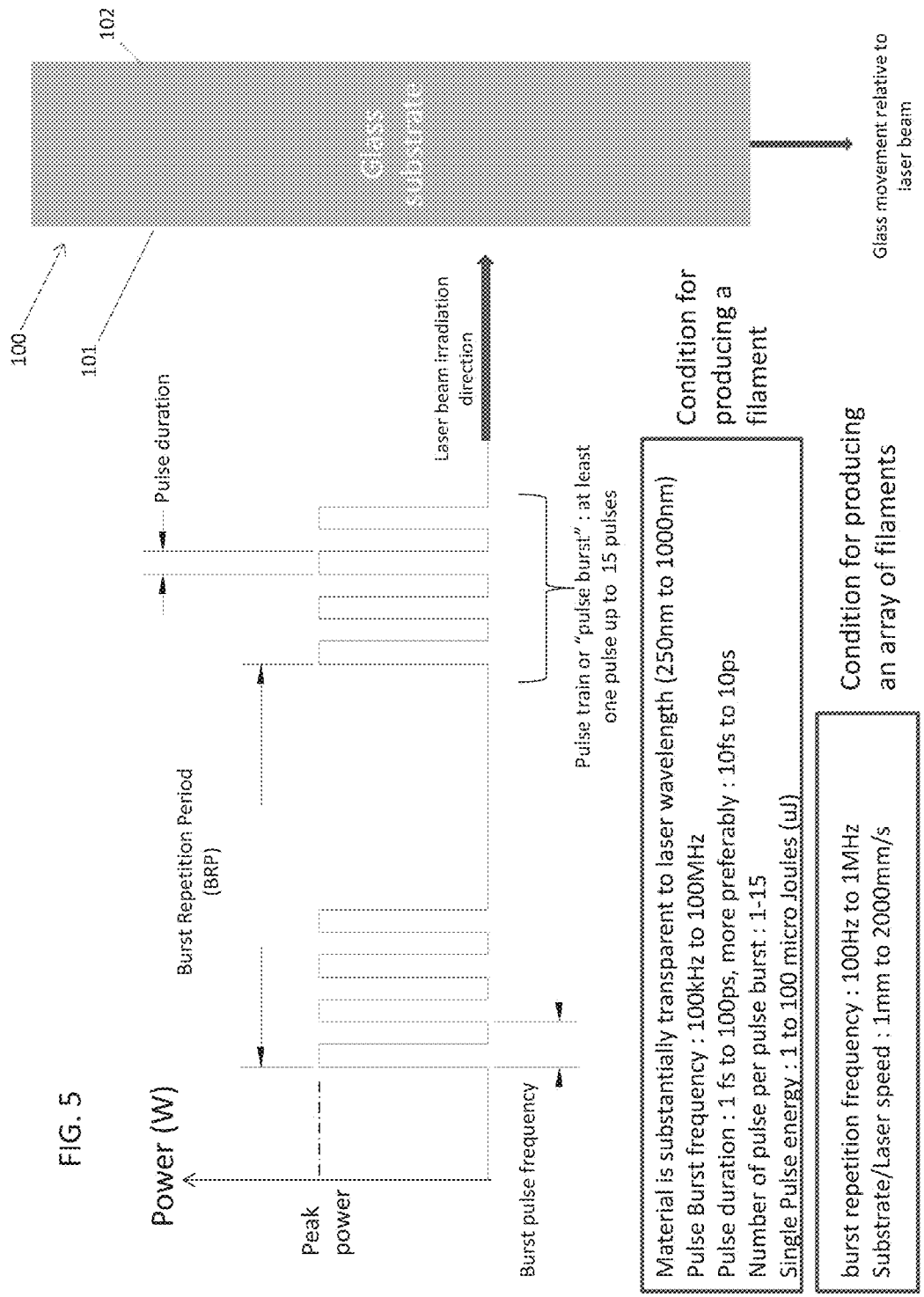
FIG. 5 illustrates a schematic of laser energy applied to a piece of glass in accordance with some embodiments.

FIG. 5 illustrates a schematic of laser energy applied to a strengthened glass substrate 100 in accordance with various embodiments of the inventions. FIG. 5 also illustrates schematic representations of a number of laser process conditions. A pulse train or burst can be referred to as one or more pulses in quick succession. In some embodiments the pulse train can include a number of pulses ranging from one laser pulse to about 15 laser pulses. In some embodiments the pulse train can include a number of pulses ranging from one laser pulse to about 5 laser pulses. The pulse train can be used to create a single laser light filament. In some embodiments the laser energy pulses in the pulse train can be repeated at a pulse burse frequency ranging from about 100 kHz to about 100 MHz. The time between separate pulse bursts defines a burse repetition period (BRP). The strengthened glass substrate can be moved relative to the laser during application of the pulse train to the substrate. The pulse train can produce a single filament even with movement of the substrate because of the relative fast repetition of the pulses within a pulse train and the relatively high pulse burse frequency relative to the motion of the substrate. For example, each of the pulses in the pulse train can overlap relative to a position on the surface of the strengthened glass.

In the embodiment illustrated in FIG. 5, conditions for producing a filament are: the material is substantially transparent to the laser wavelength (which is in the range of 250 nm to 1000 nm); the pulse burst frequency is in the range of 100 kHz to 100 Mhz; the pulse duration is in the range of 1 femtosecond to 100 picoseconds (preferably in the range of 10 femtoseconds to 10 picoseconds); the number of pulses per burst is in the range of 1 to 15; and the single pulse energy is in the range of 1 µJ to 100 µJ. In the embodiment of FIG. 5, conditions for producing an array of filaments are a burst repetition frequency in the range of 100 Hz to 1 Mhz and a substrate/laser speed of 1 mm/s to 2000 mm/s.

The wavelength of the laser can be varied. In some embodiments applying laser energy includes applying a pulsed laser having a wavelength of about 250 nm to about 1100 nm.

The pulse duration can be varied. In some embodiments the pulse duration ranges from about 1 femtosecond to about 100 picoseconds. In some embodiments applying laser energy includes pulsing laser energy with a pulse duration ranging from about 10 femtoseconds to about 100 picoseconds. In some cases the pulse duration ranges from about 10 femtoseconds to about 10 picoseconds.

The energy in a single laser pulse can be selected based on the thickness and composition of the glass. For some glasses, thicker glass requires higher pulse energy. In some embodiments, applying laser energy comprises applying a pulsed laser having a pulse energy of about 1 µJ to about 400 µJ. In some embodiments, applying laser energy comprises applying a pulsed laser having a pulse energy of about 1 µJ to about 200 µJ. In some embodiments, applying laser energy comprises applying a pulsed laser having a pulse energy of about 1 µJ to about 100 µJ. In some embodiments, the energy for a single pulse can be from about 1 µJ to about 50 µJ.

The beam width of the laser can be varied. In some embodiments the beam width is less than about 20 µm. In some embodiments the beam width can be from about 0.5 µm to about 10 µm. In some embodiments the beam width can be from about 0.5 µm to about 5 µm.

The pulse bursts or trains can be repeated at a desired frequency. In some embodiments the pulse train is repeated at a frequency of about 100 Hz to about 1 MHz. The frequency for repeating each of the pulse bursts/trains can also be expressed as the burst repetition period, which is the inverse of the frequency for repeating the pulse bursts/trains. The pulse in a first pulse train can apply laser energy to a first position on the strengthened glass substrate. The pulses in a second pulse train can apply laser energy to a second position on the strengthened glass substrate. The pulse trains can be used to apply laser energy to the substrate to produce a filament pattern along a desired cut line in the strengthened glass substrate. The frequency for repeating the pulse train can be selected in combination with the relative movement between the laser and glass substrate to achieve a desired separation between the laser filaments.

In some embodiments the glass substrate is translated relative to the laser. In some embodiments the laser is translated relative to the glass substrate. The glass substrate and laser are moved at a speed of about 1 mm/s to about 2000 mm/s relative to each other. The translation speed of the laser or substrate can be selected in combination with the laser parameters to achieve a desired distance between the laser filaments on the strengthened glass substrate. In some embodiments the applied laser energy is translated relative to a surface of the strengthened glass substrate at a speed ranging from 100 mm/s to 5000 mm/s.

Figure 6A:
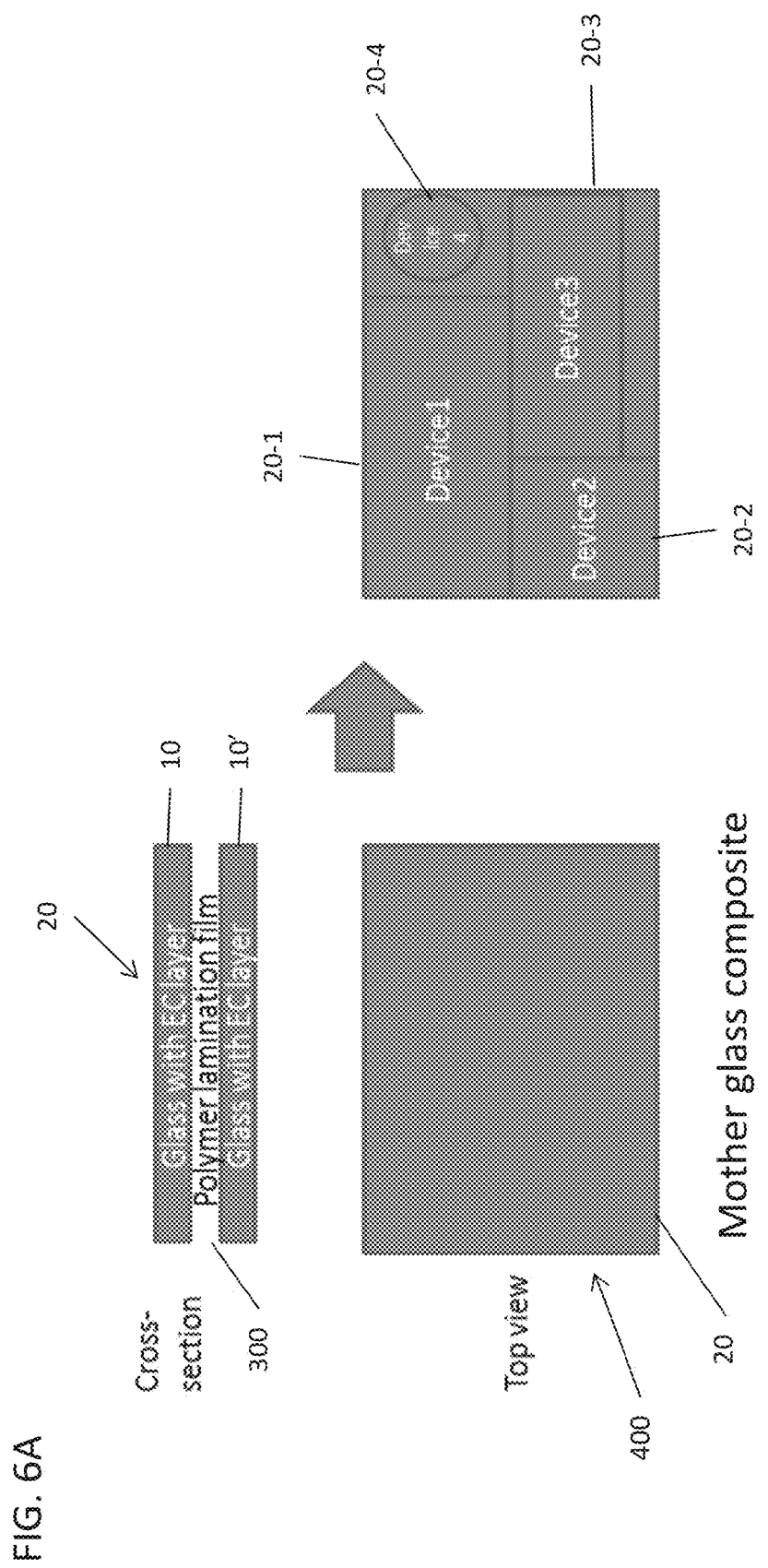
FIG. 6A is a schematic illustration of a method for cutting a glass substrate in accordance with an embodiment.

FIG. 6A illustrates a cross-sectional view of a illustrative laminate, such as an electrochromic device 20 including two electrochromic composites 10, 10', each of which comprises a strengthened glass substrate with an electrochromic layer, such as a cathodic or anodic electrochromic layer (see FIG. 1), where such composites 10, 10' are laminated together, for example, by a polymer layer 15. The polymer layer 300 can comprise an ion conducting material in electronic communication with each of the anodic and cathodic electrochromic layers. The electrochromic device 20 can, in preferred embodiments, be provided as a mother glass composite 400. The mother glass composite 400 can comprise an integrated (continuous) large area electrochromic device 20, or alternatively can comprise an array of two or more spatially discrete electrochromic devices, each comprising a corresponding spatially discrete portion of a large strengthened glass substrate. The mother glass composite 400 can be cut into smaller device sizes using a laser (e.g., a laser filamentation process) according to the methods described herein, as illustrated in FIG. 6 to form two or more spatially discrete electrochromic devices (e.g., illustrated as 20-1, 20-2, 20-3, 20-4) each having desired device shapes. In some embodiments, laser energy can be applied to an electrochromic device using two or more lasers. In some embodiments, laser energy can be applied to an electrochromic device (e.g., to a motherglass substrate comprising an electrochromic device) using one or two lasers by focusing laser energy on or in proximity of a surface of a first strengthened glass substrate (e.g., surface 102 of substrate 100, FIG. 1B). In an alternative approach, laser energy can be applied to an electrochromic device (e.g., to a motherglass substrate comprising an electrochromic device) using a first laser focusing laser energy on or in proximity of a surface of a first strengthened glass substrate (e.g., surface 102 of substrate 100, FIG. 1B) and a second laser focusing laser energy on or in proximity of a surface of a second strengthened glass substrate (e.g., surface 201 of substrate 200, FIG. 1B).

Figure 6B:
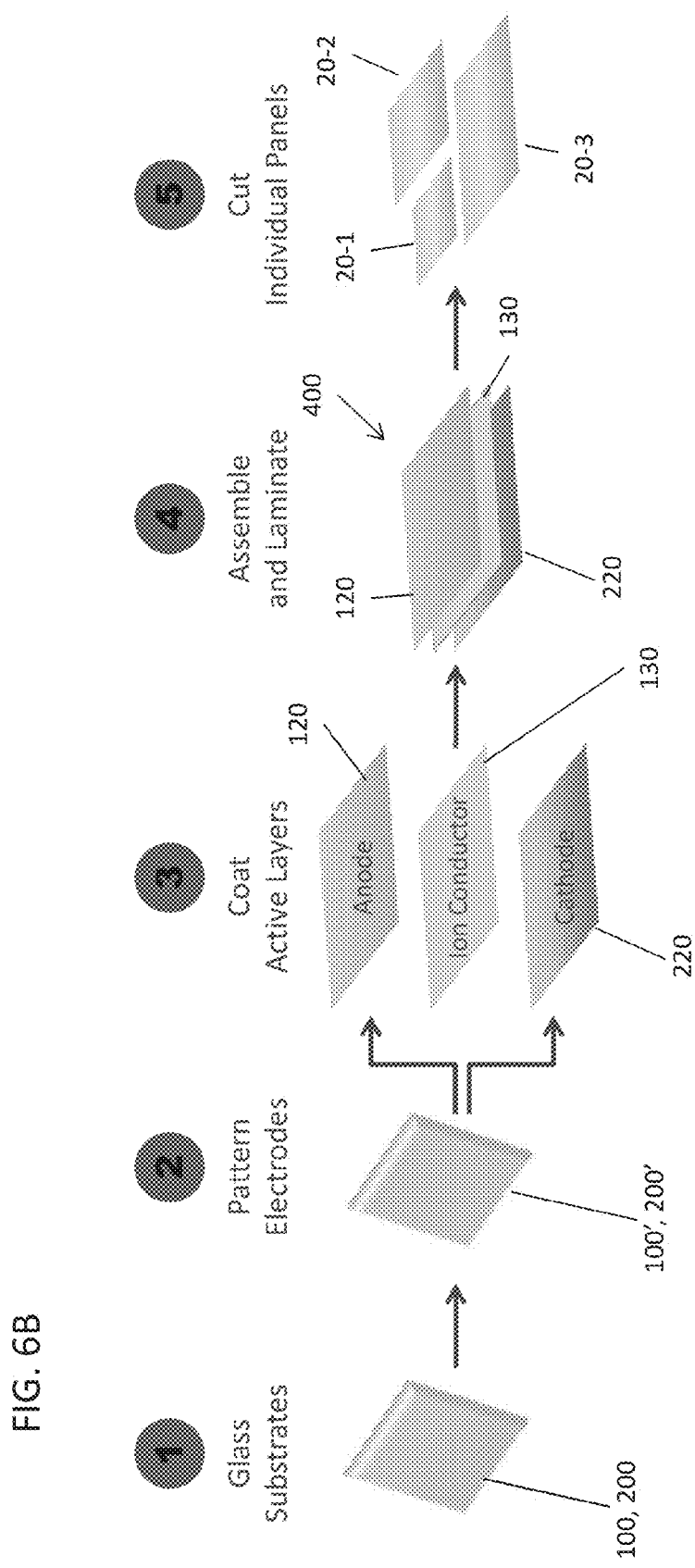
FIG. 6B is a schematic illustration of a method for cutting laminates assembled from glass substrates in accordance with an embodiment.

FIG. 6B is a schematic illustration of a method for cutting laminates such as electrochromic composites or electrochromic devices assembled from glass substrates in accordance with an embodiment. Glass substrates 100, 200 are provided and patterned with electrodes (electrodes are not depicted in the figures). The glass substrates having patterned electrodes, represented as 100', 200' can be coated with active layers, such as an electrochromic anode 120, electrochromic cathode 220, and ion conductor 300. The glass substrates with anode and cathode can then be assembled as a laminate composite with an ion conductor to form a mother glass composite 400 (e.g., comprising one or more electrochromic devices). The assembled mother glass composite 400 can then be cut into individual panels such as individual electrochromic devices 20-1, 20-2, 20-3 using the laser filamentation processes described herein.

In some embodiments, after applying laser energy and additionally or alternatively, while applying laser energy, a force is applied to the strengthened glass substrate to controllably separate the strengthened glass substrate. The force can be applied by machine, hand, or the weight of the glass. The substrate can be controllably separated or cleaved along the line or area where laser energy was applied to the strengthened glass. The glass substrate can be controllably separated along the filamentation pattern.

The laser conditions can be selected to result in an improved edge quality and strength in the cut pieces. The strength of glass is not a simple value. Glass is a brittle material which fails due to the presence of defects present in the bulk, on the surface, or around the edges. The ASTM C158-02 describes a standard method for testing the modulus of rupture of glass using a four point bending test and a sample size of around 30 specimens. It further suggests reporting the average value of the modulus or rupture for the group and the standard deviation estimate of the mean. However, for mechanical design purposes, these values are typically quite insufficient. It is usually important to have an idea of the probability of failure for a given stress. More sophisticated ways of describing the strength of glass relies on physical-based probability models. One of the most common, and simple models uses a Weibull probability function to describe the distribution of failure stresses. The basic, two function Weibull model giving the failure probability F of a glass specimen is: $F(\sigma)=1-\exp[-(\sigma/\sigma_0{}^\wedge m)]$ where $F(\sigma)$ is the probability of failure of a specimen under test at the stress sigma, m is the Weibull modulus which describes the homogeneity of the flaw distribution and $\sigma_0$ is the characteristic strength ($F(\sigma_0)=63.21\%$). By plotting $\ln(\ln(1/1-F))$ vs. $\ln(\sigma)$ it is straight forward to determine m and $\sigma$). It should be noted that this type of simple model does not always fit well with the test data because test conditions such as temperature, humidity, glass composition, edge quality, load rate, etc. can have significant influence on the modulus of rupture in which case more complicated models should be used. For applications such as solar panels and tintable glass, it is desired to have a low probability of rupture at stress levels typically experienced by the product when installed in the field or on a building. Heat strengthened glass and tempered glass usually meet that requirement with a probability of failure <5% for stresses up to around 40 MPa. For fully tempered glass, stress up to around 100 MPa can be tolerated at the 5% probability number. The methods disclosed herein for cutting thermally strengthened glass with a laser can yield at least one cut piece meeting the aforementioned strength characteristic. In some embodiments at least one of the cut pieces has a modulus of rupture of greater than about 40 MPa. In some embodiments at least one of the cut pieces has a modulus of rupture of greater than about 100 MPa. In some embodiments the piece of cut glass has a probability of failure of less than about 5% under a 40 MPa load or 100 MPa load. In some embodiments two or more cut glass pieces have a Weibull modulus greater than 10. For assessing the probability of failure for a given force or load a set of cut glass pieces can be tested.

In some embodiments the cut edges can be further strengthened after cutting. In some embodiments laser energy is applied to the cut edge to strengthen the cut edge. In some embodiments a chemical treatment is performed to the cut edge or glass substrate. In some embodiments a coating is applied to the cut edge, for example, the coating can comprise a metal, an oxide, or a polymer.

FIG. 7 is a schematic illustration of a laser edge treatment of a glass substrate 100 in accordance with an embodiment.

Figure 7B:
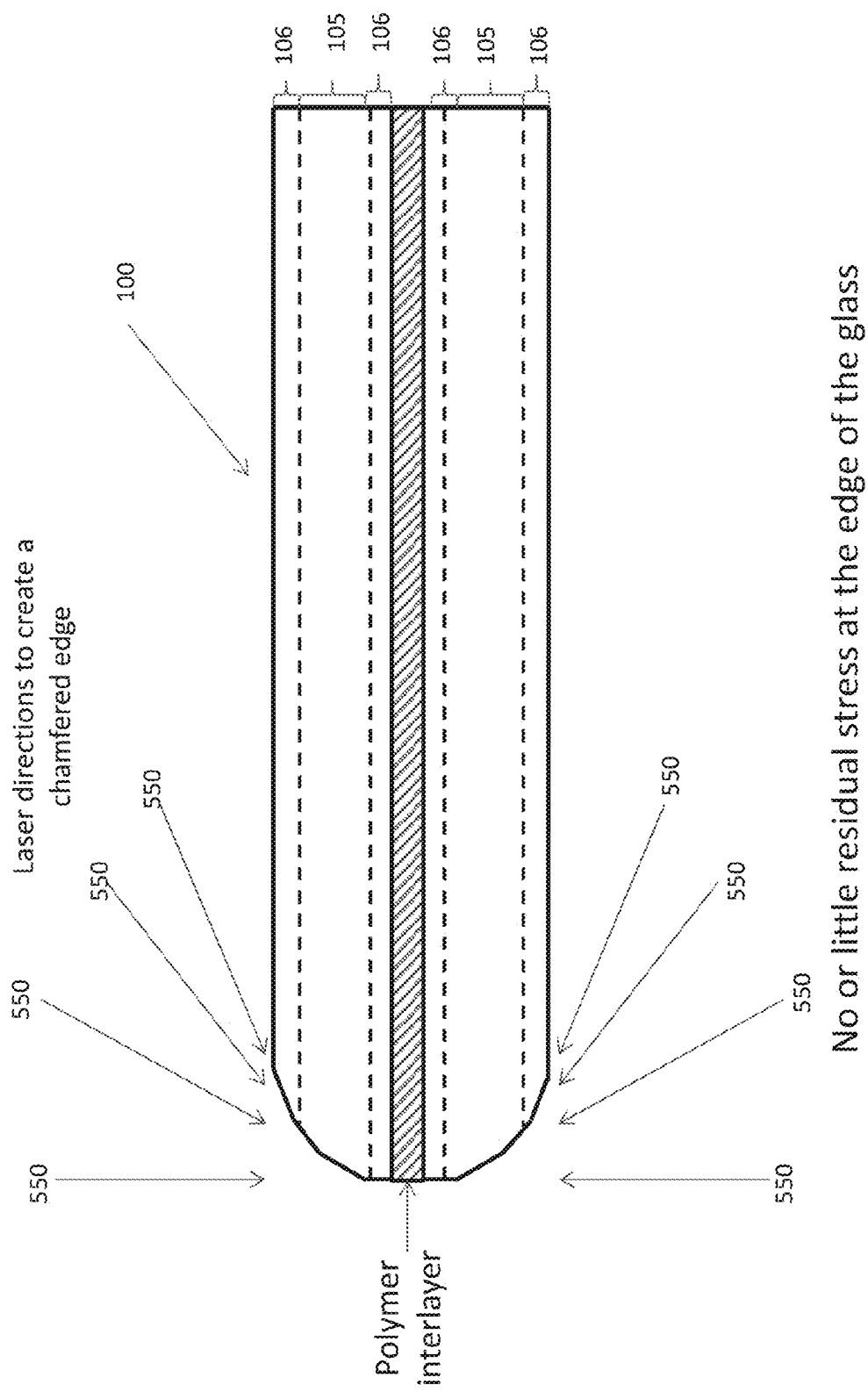
FIGS. 7-7C are schematic illustrations of laser edge treatments in accordance with embodiments.

Laser energy 550 can be applied to the cut edge to form a chamfered edge. The chamfered edge can reduce or remove residual stress at the edge of the glass to further strengthen the cut glass edge. This process can be repeated for additional angles as shown in FIG. 7A to create an edge with a smoother profile. As the number of angles increases the edge better approximates a pencil edge profile, with a diameter equal or larger than the glass thickness. Such a pencil-like edge can reduce or remove residual stress at the edge of the glass to further strengthen the cut glass edge. FIG. 7B is a schematic illustration of a laser edge treatment of two glass substrates 100 in accordance with an embodiment. When the laser edge treatment of FIG. 7B is applied to a glass substrate, there may be no or little residual stress at the edge of the glass. The glass substrates 100 are illustrated as separated by a polymer interlayer. Other layers can be between the glass substrates 100. FIG. 7C is a schematic illustration of a laser cutting a glass substrate 100 and concurrently performing an edge treatment on the cut edges in accordance with an embodiment. The laser energy 550 can be applied to cut the piece of glass to form two cut edges and simultaneously or concurrently chamfer the two cut edges. A chamfered edge may provide better durability on some applications.

FIG. 8 is a schematic illustration of a polymeric edge treatment of a glass substrate 100 in accordance with an embodiment. The polymeric edge treatment can include coating the edge with a layer 600 of a polymer material. Examples include poly-methacrylates, epoxies, polyurethanes, poly-silicones, poly-iso-butylenes, etc. FIG. 8A illustrates a polymer edge coating 600 (such as polyurethanes, poly-iso-butylenes, poly-silicones, etc.) for a glass edge having a smoother profile, such as the edge profile of the glass substrate illustrated in FIG. 7A.

FIG. 9 is a schematic illustration of a chemical edge treatment of a glass substrate 100 in accordance with an embodiment. An example of a chemical edge treatment includes treating the edge with an etchant 700 such as hydrofluoric acid. The hydrofluoric acid treatment can remove microcracks in the edge to strengthen the cut edge. FIG. 9A illustrates a chemical edge treatment 700 for a glass edge having a smoother profile, such as the edge profile of the glass substrate illustrated in FIG. 7A. The chemical edge treatment can remove eventual microcracks to further increase edge strength.

The edge treatment of glass is a critical step in the process of preparing glass for architectural and transportation applications. Glass sheets are edge treated after being cut to remove defects on the cut edge, such as indents, chips, teeth, grooves, etc. A high-quality and defect-free edge is one of the main factors preserving the strength of glass during processing and further use. For example, edge treatment is required to prevent fracture of the glass during thermal strengthening and for this reason edging is always performed before this operation. Edge treatment also prevents spontaneous fracture of the glass as a result of thermal shock and fracture of the glass under loads occurring during service, such as loads due to wind and snow. The need to assure acceptable edge quality makes it necessary to develop new cutting technologies and improve existing ones. A widespread process for edge treating glass is diamond wheel edge grinding. However, as explained by Popov (*Glass and Ceramics*, Vol. 67, Nov. 7-8, 2010) "Edge grinding is the most critical and laborious technological operation in the production of objects made of plate glass". Therefore, cutting methods that additionally provide an edge with acceptable edge quality are desired and disclosed herein.

Figure 11:
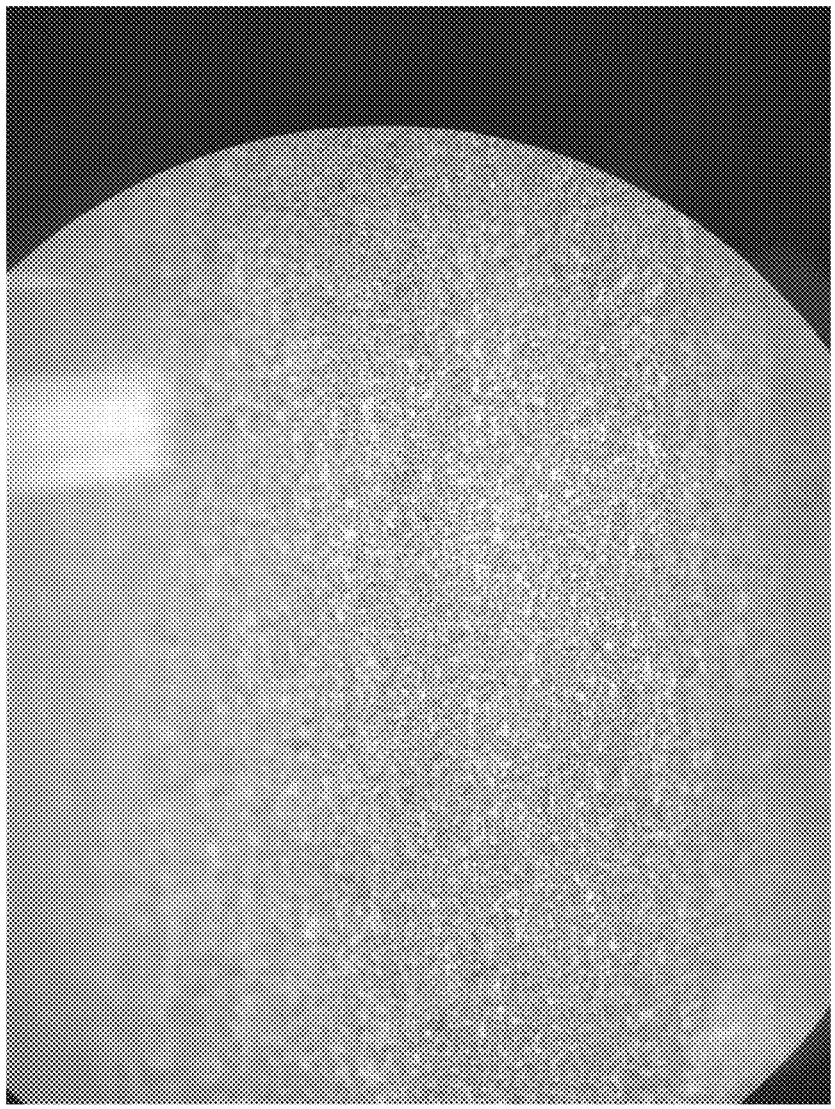
FIG. 11 is a micrograph of a mechanically ground edge.

Ground edges as illustrated in FIG. 11 display a crack free smooth surface. The texture results from small pits which vary in depth depending on the grinding conditions. Specifically, fine ground edges typically display pits with depth around 1.5 µm to 2.5 µm (See, *Glass and Ceramics*, Vol. 13, Issue 12, December 1956).

Strengthened glass, such as thermally-strengthened glass, is typically edge treated prior to strengthening. Therefore, the current paradigm for preparing thermally strengthened glass is to first cut the glass to final the size, edge treat the glass, and then thermally strengthen the glass. In contrast, in some embodiments of the invention: large pieces of glass (motherglass) are thermally strengthened, coatings and additional processes can be performed on the motherglass, and finally, the motherglass can be simultaneously cut and edge treated to provide a cut piece of glass with acceptable strength for use in architectural and transportation applications.

Figure 12:
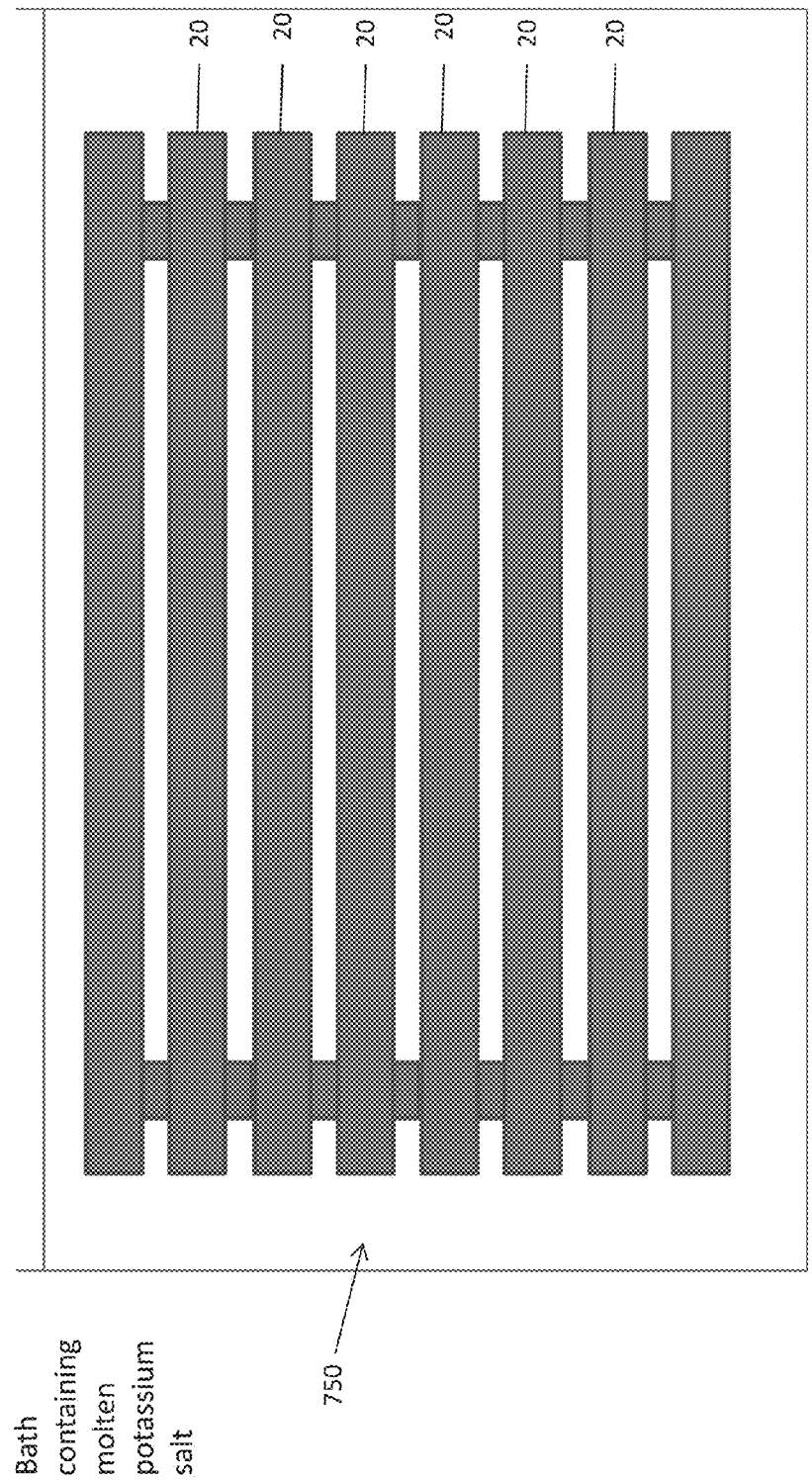
FIG. 12 is a schematic illustration of chemically strengthening a stack of laser cut glass in accordance with an embodiment.

FIG. 12 is a schematic illustration of chemical strengthening a stack of laser cut strengthened glass substrates (or composites or devices comprising such substrates—e.g., 10, 20 FIG. 1), in accordance with an embodiment—for example, as another approach for strengthening a cut edge. One or more cut strengthened glass substrates (or composites or devices comprising such substrates) can be submerged in a bath containing a chemical strengthening agent 750, for example, molten potassium salt to chemically strengthen the cut substrate.

Figure 18:
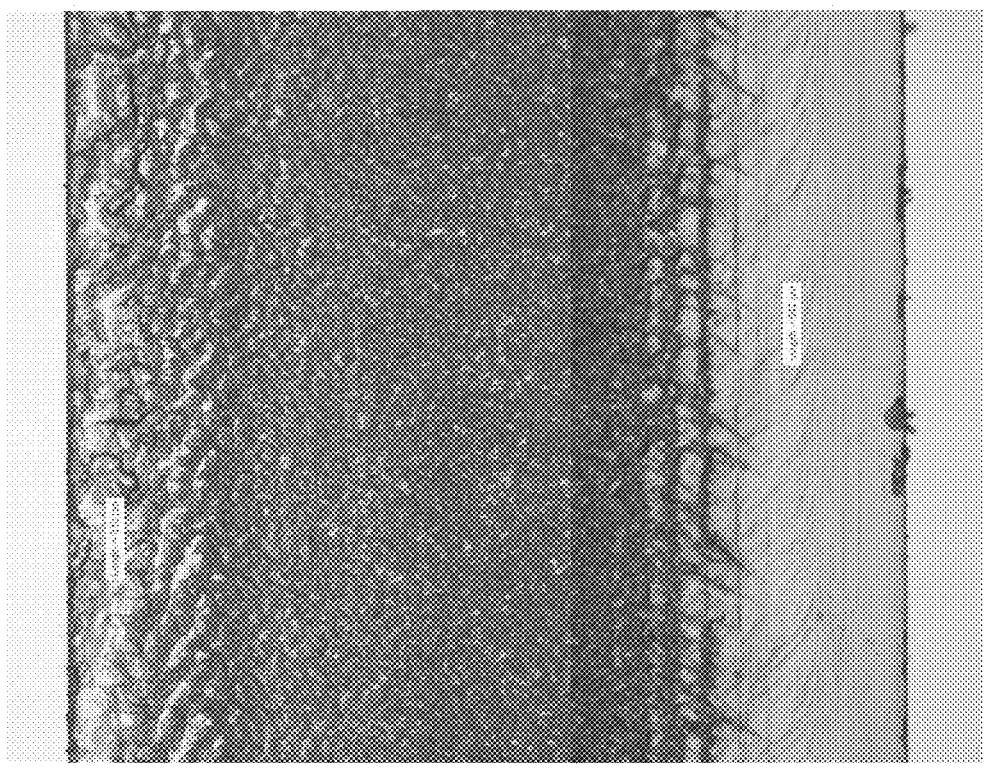
FIG. 18 is an image of an edge of a thermally-strengthened glass substrate cut using the methods described herein.

In some embodiments, a feature of laser filamentation in glass is the modification that occurs locally, around the filamentation volume. The local modification can leave a fingerprint, pattern, or indicia on the cut edge of the glass. The heat from the filament induces a localized modification that can result in a very finely textured surface. By producing filamentation volumes that nearly overlap, a uniform, smooth texture can be created. It is not necessary for pure cutting purposes to have a very fine spacing of the filamentation traces, as shown in "Display glass cutting by femtosecond laser induced single shot periodic void array" by Sumiyoshi. Sumiyoshi shows that a void array can be produced in glass to guide the cleavage of the glass. In the case of Sumiyoshi, the resulting cut edge is not uniformly smooth and cracks propagate from filament void to filament void during the cleavage step. The preferred method disclosed herein produces a cut edge surface as shown in FIG. 18, in which the cut edge presents a large area of uniform finely textured glass. In the embodiment of FIG. 18, the desired texture covers about 80% of the edge but the laser power can be increased to produce filamentation modification along the whole surface. By providing a high edge quality, the cut piece of glass of strengthened glass maintains its high strength.

Figure 13A:
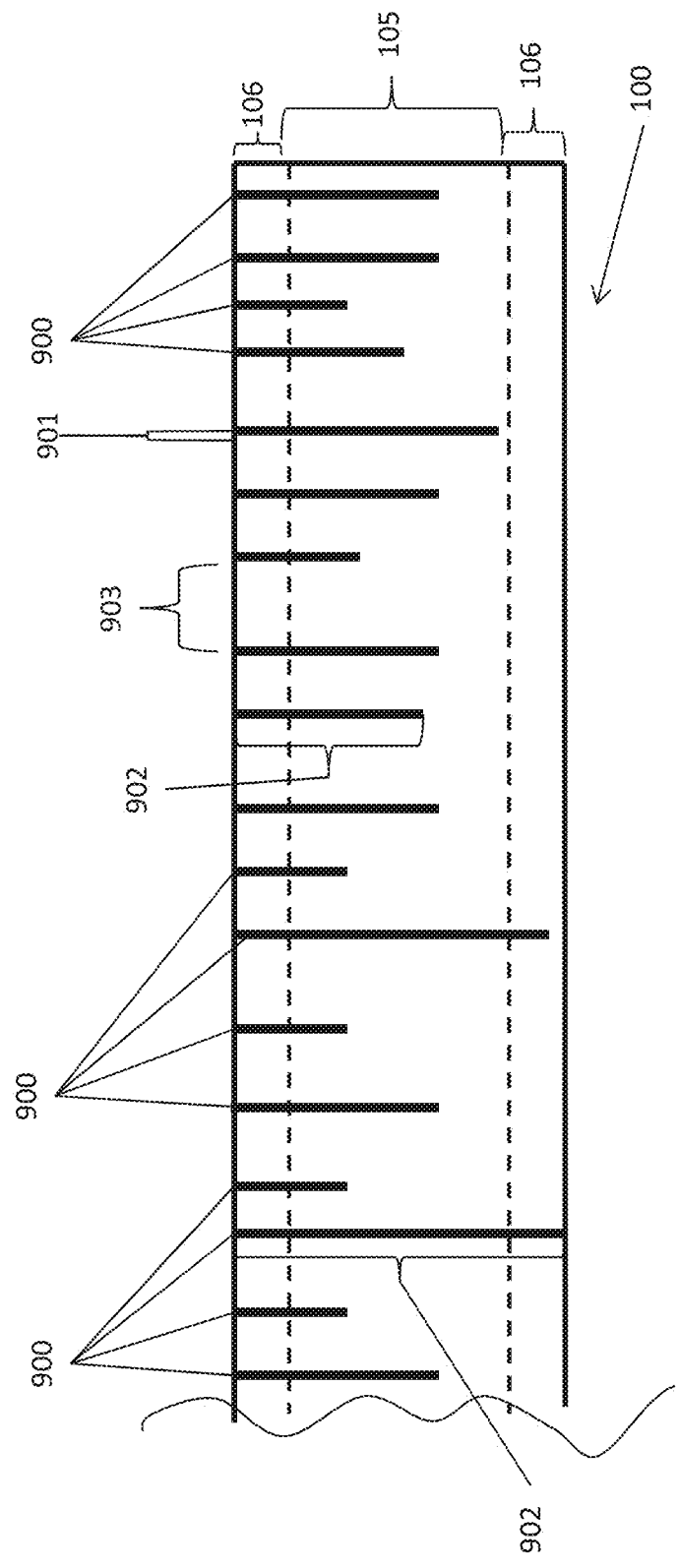
FIG. 13A is a schematic illustration of a glass substrate, not drawn to scale, showing indicia of a laser filamentation process.

The laser processes described herein can leave a fingerprint on the edge of the cut strengthened glass. Laser filamentation and cleaving can leave a fingerprint, pattern, or indicia on the edge of the cut glass that is unique to the cutting process and laser parameters. For example, the cut edge of the glass can have indicia of a laser filamentation cutting process. The indicia can be a series of a plurality of filamentation traces. In some embodiments, the indicia of a laser filamentation cutting process comprises a filamentation pattern defined by a series of regularly recurring substantially parallel filamentation traces. In some embodiments the filamentation traces are oriented substantially perpendicular to the first surface of the glass and second surface of the glass opposing the first surface. Devices or composites including a cut strengthened glass substrate with the fingerprint or indicia of the laser process are disclosed herein. The indicia of the laser process can be imaged using optical microscopy. The indicia can include areas where laser filament traces are visible and other areas that may appear smooth or not visibly include a portion of a filament. Examples of the indicia are shown in FIGS. 13A, 13B, 14, and 16-19. FIG. 13A is a schematic illustration of a glass substrate, not drawn to scale, showing indicia of a laser filamentation process. The indicia include filament line traces 900. The filament line traces 900 have a width 901 and length 902. The filament line traces 900 have an aspect ratio defined by the ratio of the length 902 to the width 901 of the filament line trace 900. The adjacent laser filament traces can be separated by a distance 903.

In some embodiments the filamentation traces extend from the first surface of the glass towards the second surface of the glass opposing the first surface. The traces extend along the cut face of the glass from the first surface towards the second surface of the glass. In some embodiments each of the filamentation traces extend from the first surface toward the second surface to a depth of at least 75% of the thickness of the glass. In some embodiments each of such filamentation traces extend from the first surface toward the second surface to a depth of at least 90% of the thickness of the glass. In some embodiments each of such filamentation traces extend from the first surface toward the second surface to a depth of at least 95% of the thickness of the glass. In some embodiments each of such filamentation traces can extend substantially the entire thickness of the glass.

The distance separating filamentation traces can vary. The laser pulse repetition (e.g. train/burst frequency) and translation speed and other parameters can be selected to achieve a desired separation between adjacent filamentation traces. In some embodiments the distance between adjacent filamentation traces is about 0.1 µm to about 40 µm. In some embodiments the distance between adjacent filamentation traces is about 1 µm to about 20 µm. In some embodiments the distance between adjacent filamentation traces is about 1 µm to about 10 µm. In some embodiments the distance between adjacent filamentation traces is about 1 µm to about 5 µm.

The filamentation traces can have a visible aspect ratio. The filamentation traces have a filamentation trace length and a filamentation trace width with a filamentation trace aspect ratio defined by the ratio of the filamentation trace length to the filamentation trace width. In some embodiments the filamentation trace has an aspect ratio of greater than about 5:1. In some embodiments the filamentation trace has an aspect ratio of greater than about 10:1. In some embodiments the filamentation trace has an aspect ratio of greater than about 20:1. In some embodiments the filamentation trace has an aspect ratio of greater than about 50:1. In some embodiments the filamentation trace has an aspect ratio of greater than about 100:1. In some embodiments the filamentation trace has an aspect ratio of greater than about 200:1. The aspect ratio can refer to the aspect ratio for a single filament trace or an average of a sample of filament traces. For example the aspect ratio for a set of 5, 10, or 20 filament traces can be determined and averaged.

In some embodiments the filamentation traces can have a width of about 0.5 µm to about 10 µm. In some embodiments the filamentation traces can have a width of about 0.5 µm to about 5 µm. In some embodiments the filamentation traces can have a width of about 0.5 µm to about 3 µm. In some embodiments the filamentation traces can have a width of about 1 µm to about 3 µm. In some embodiments the filamentation traces can have a width of about 1 µm to about 5 µm. The width of the filamentation trace can be determined using optical microscopy. The width of a single filamentation trace can be measured or a set of filamentation trace widths can be measured and averaged. For example a set of 5, 10, or 20 filamentation traces can be measured and averaged.

In some embodiments the filament traces can overlap in regions. For example, the filament traces can overlap to create a surface that has a ground-like surface that is free of "cracks", or textured to look like re-melted glass. In some embodiments greater than about 70% of the cut edge surface can have the filament line traces and textured surface of the laser indicia described herein, as shown in FIG. 18. The indicia shown in FIG. 16 is different than the smooth surface shown in FIG. 16 that would be obtained from cleaving glass by the propagation of a crack.

The indicia of the laser filamentation cutting process can be characterized by a surface roughness. In some embodiments the laser filamentation process can result in a cut face with a surface roughness of less than 20 µm root mean square ("rms"). In some embodiments the laser filamentation process can have a surface roughness of less than 10 µm rms. In some embodiments the laser filamentation process can have a surface roughness of less than 5 µm rms. In some embodiments the laser filamentation process can have a surface roughness of less than 2 µm rms.

Figure 13B:
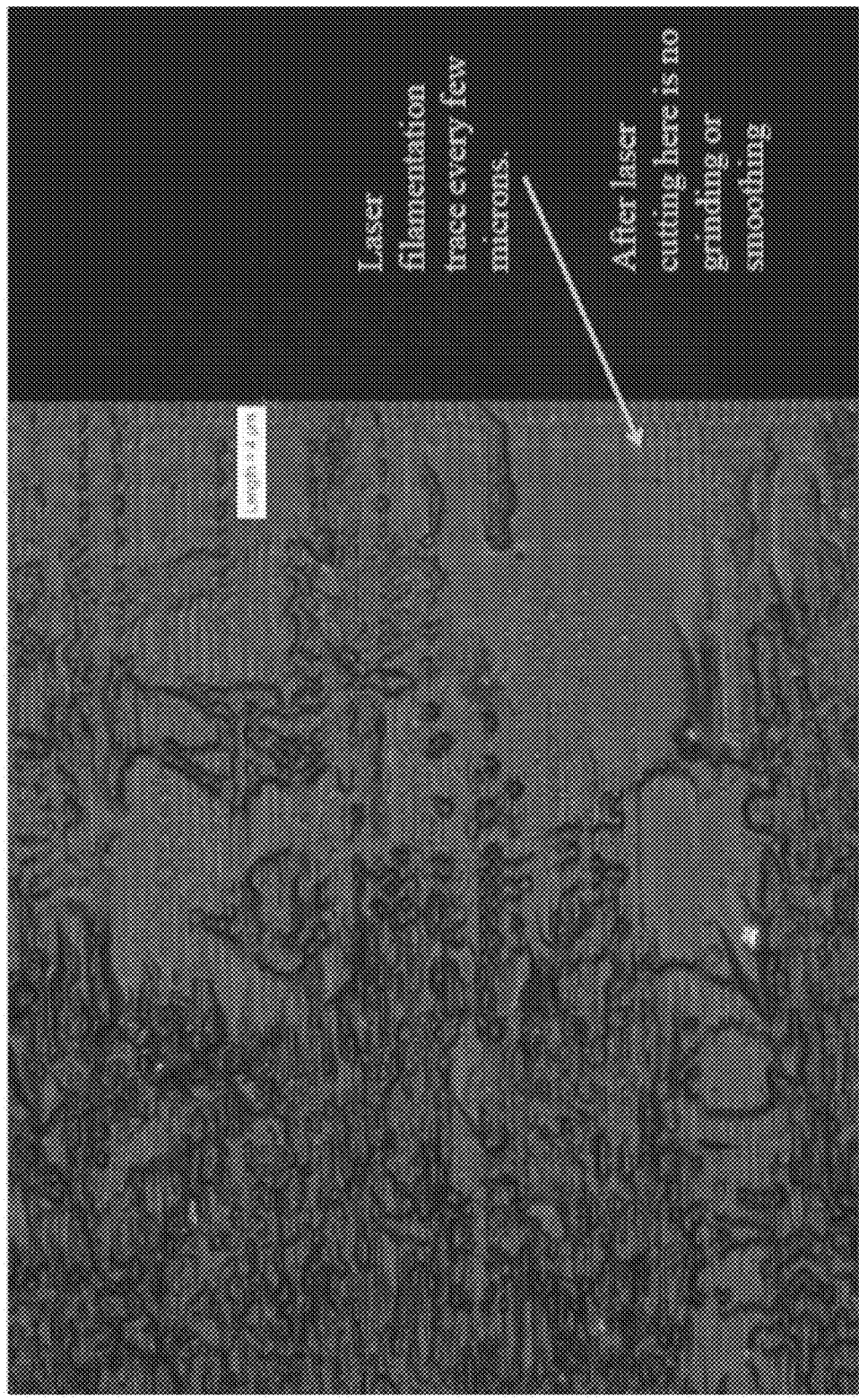
FIGS. 13B and 14 are images of the edge of thermally-strengthened glass substrates cut using the methods described herein.
Figure 14:
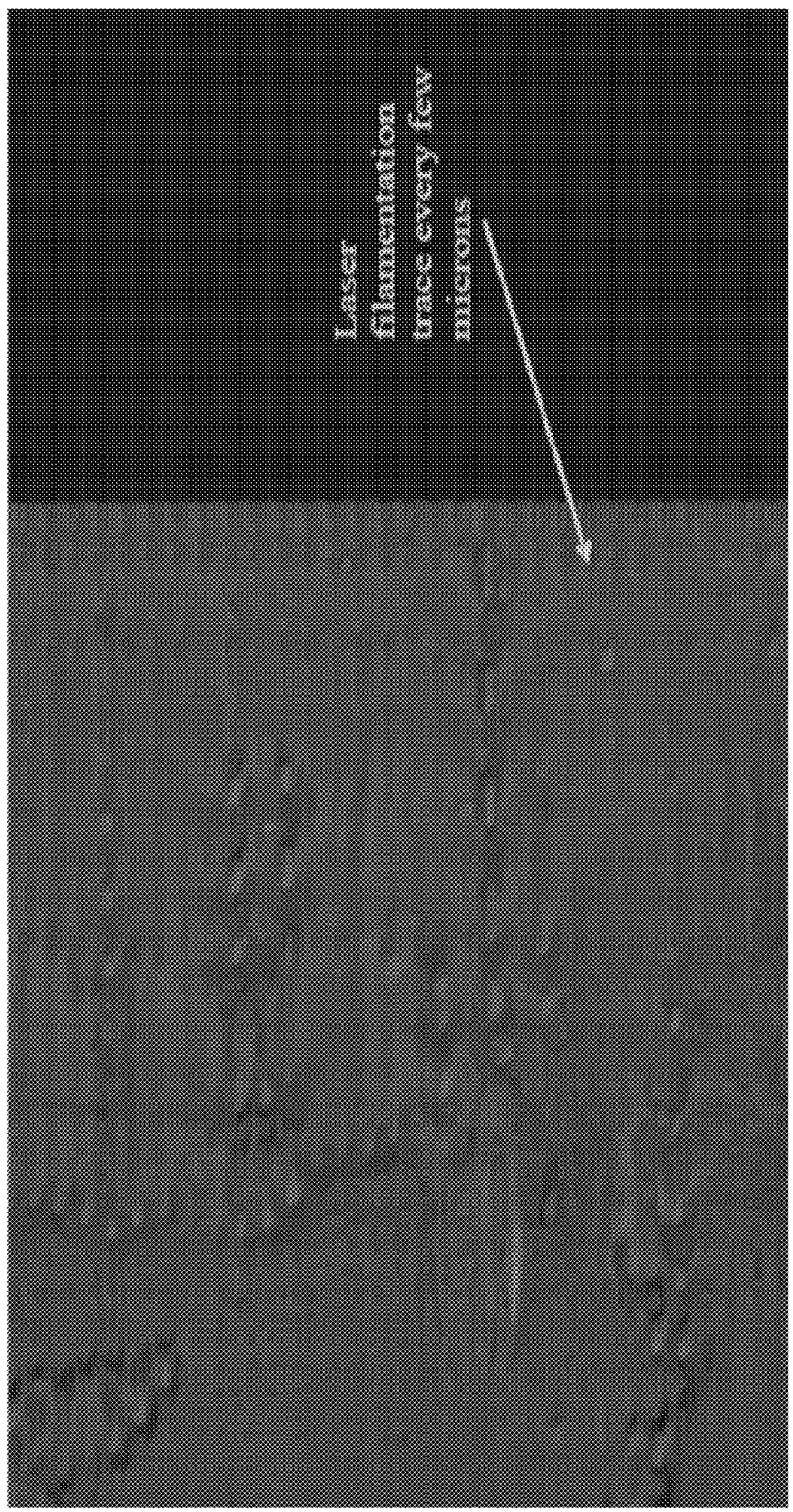

Examples of images of the laser indicia are shown in FIGS. 13B and 14. FIGS. 13B and 14 show examples of laser filamentation cut indicia on the surface of the glass with parallel laser trace lines that are perpendicular to the surface of the glass. The illustrated laser filamentation fingerprint shows parallel laser filamentation traces having a thickness of about 1 µm with the spacing between the traces of about 2 to about 3 µm. A spacing between the traces may also be about 4 µm.

Figure 16:
FIG. 16 is an image of an edge of a thermally-strengthened glass substrate cut using the methods described herein.
Figure 17:
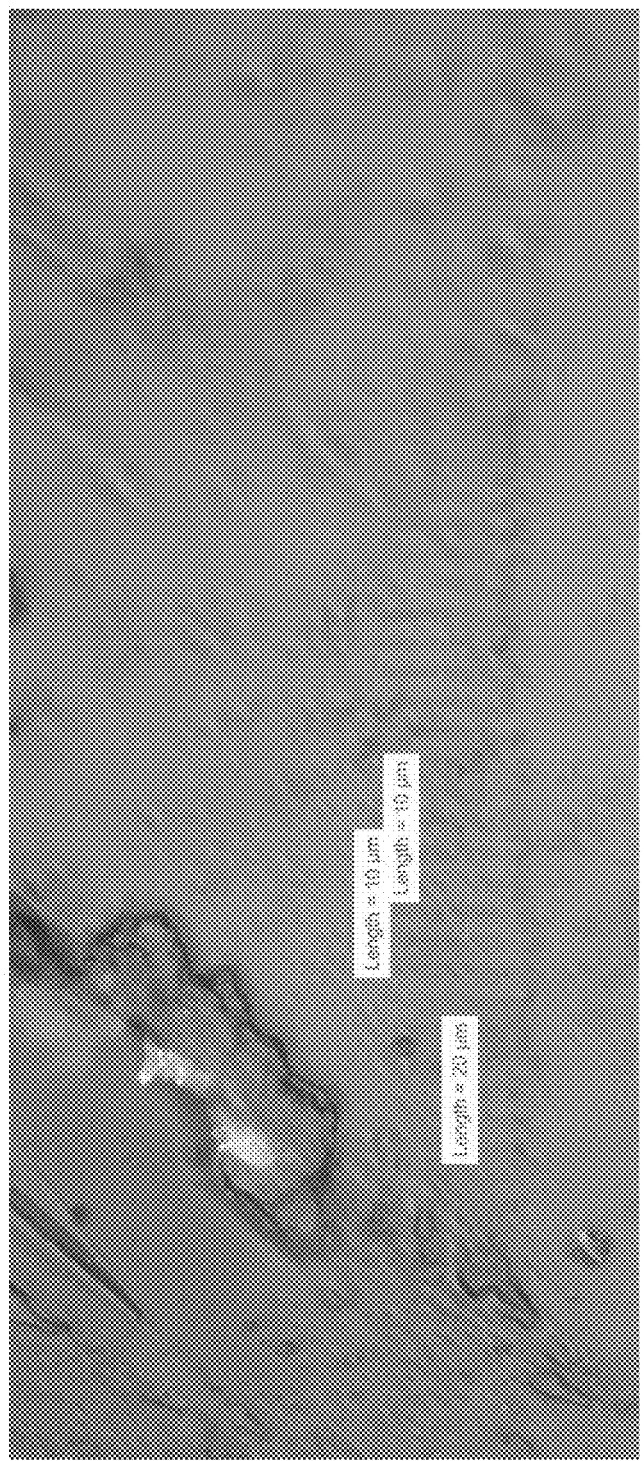
FIG. 17 is an image of an edge of a fully tempered glass substrate cut using the methods described herein at a magnification of 50×.
Figure 19:
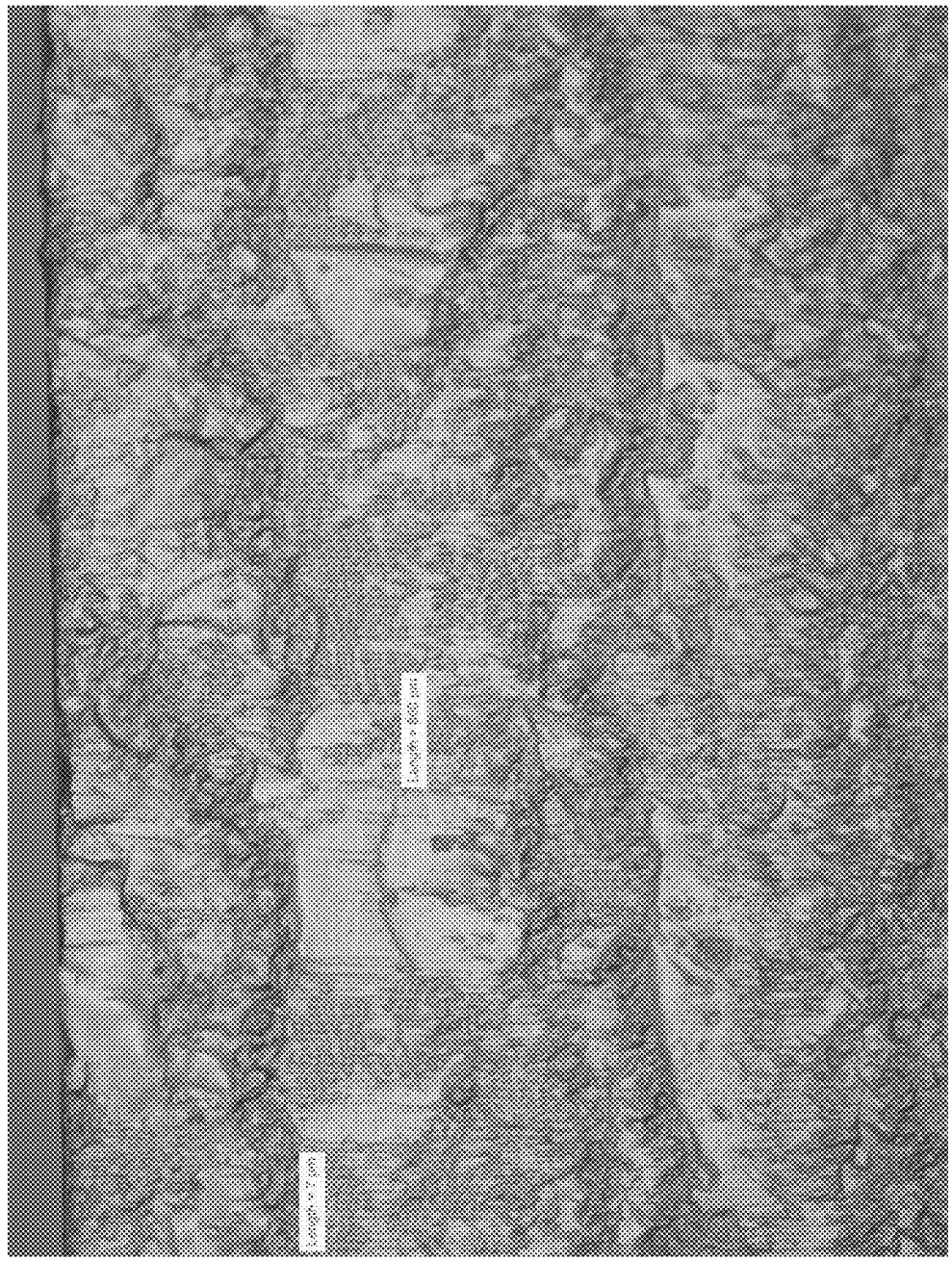
FIG. 19 is an image of an edge of a thermally-strengthened glass substrate cut using the methods described herein.

FIGS. 16-19 show additional examples of the laser indicia described herein. FIG. 16 illustrates a cut edge of a thermally tempered glass with laser indicia showing filamentation traces of about 168 µm and 221 µm long. The periodicity of the laser filamentation traces is also illustrated with a distance of about 10 µm between filamentation traces. FIG. 17 illustrates a 50× magnification of the cut edge of fully temperature glass. The visible laser filamentation traces have lengths of 20 µm and greater and a high aspect ratio. The periodicity of the laser filamentation traces is also illustrated with a distance of about 10 µm between three filamentation traces. FIG. 18 illustrates a cut edge of a thermally strengthened glass with laser indicia over greater than about 70% of the thickness of the cut edge. Laser indicia of FIG. 18 includes laser indicia that are about 542 µm long. FIG. 19 illustrates filamentation traces that are visible and extend over a long distance, e.g. about 800 µm although some filamentation traces morph and produce a ground like texture. The spacing between a set of traces in FIG. 19 is about 7 µm.

In some embodiments the laser energy can be applied using two or more lasers. The laser energy can be applied to the same surface of the substrate. In some embodiments, one laser applies laser energy to a first surface of the substrate and a second laser applies laser energy to a second surface of the substrate opposing the first surface. In some embodiments multiple lasers are apply energy along the same cut line. The multiple lasers can scan the cut line simultaneously or can scan the cut line in a staggered configuration. The multiple lasers can be used to apply energy to different areas of the glass substrate. In some embodiments three lasers are used with one laser providing a filamentation cut line, one laser providing a first edge filamentation chamfer line and one laser providing a second edge filamentation chamfer line.

In some embodiments a single pass with the laser is sufficient. In some embodiments, multiple passes are used to cut the strengthened glass substrate.

Figure 15:
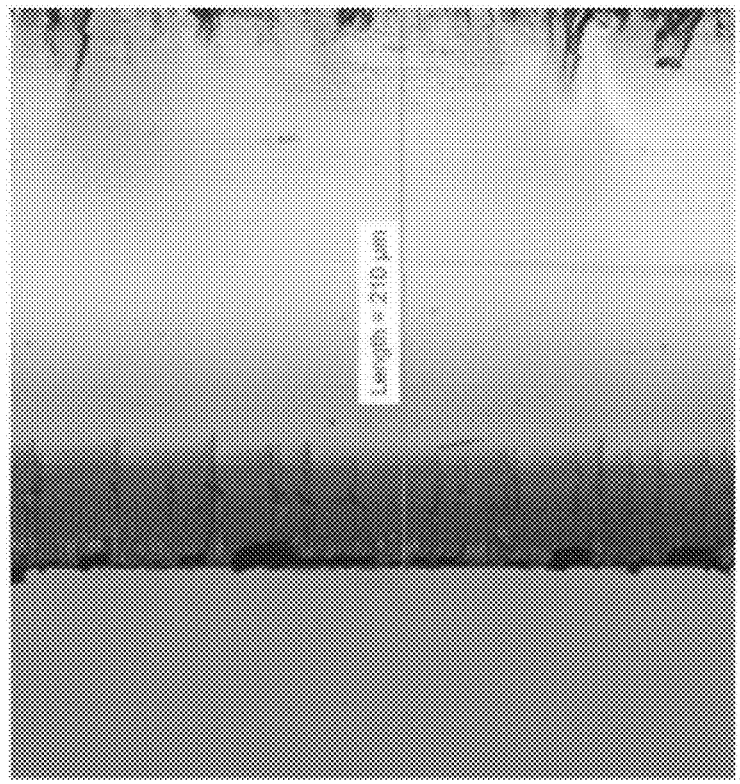
FIG. 15 is an image of a mechanically cleaved edge of a glass substrate.

The edges produced by the laser filamentation process are high quality and do not require post processing like grinding or smoothing. FIGS. 13B, 14 and 16-19 show high edge quality and a lack of cracks on the edge surface. In contrast, FIG. 15 is a picture of a glass edge that has been mechanically cleaved and shows cracks on the edge surface.

Various types of glass can be cut using the methods disclosed herein. The glass to be cut can be referred to generally as a substrate, lite, or motherglass. Examples of glass include soda-lime glass, borosilicate glass, aluminosilicate glass, alumino-borosilicate glass, etc. The glass can be chemically or thermally-strengthened.

A coated glass substrate can include an inorganic single or multi-film coating. Examples of coated soda-lime glass include double silver and triple silver low-e coated glass, anti-reflective coated glass, and fluorine doped tin oxide (FTO) coated glass.

Higher thermal expansion glass substrates are more difficult to cut with a laser process as local thermal gradients in the glass can generate local stresses and result in breaking. It is desirable to have a cutting process that induces low thermal heating of the glass to enable cutting of high thermal expansion glasses. It is significant that glass having moderate to high coefficients of thermal expansion can be used with the methods disclosed herein. In some embodiments the strengthened glass substrate has a coefficient of thermal expansion of greater than $4 \times 10\text{-}6$ per °K. In some embodiments the strengthened glass substrate has a coefficient of thermal expansion of greater than $7 \times 10\text{-}6$ per °K. In some embodiments the strengthened glass substrate has a coefficient of thermal expansion of greater than $9 \times 10\text{-}6$ per °K. In some embodiments the strengthened glass substrate has a coefficient of thermal expansion of less than $4 \times 10\text{-}6$ per °K. Borosilicate glass typically has a coefficient of thermal expansion of about $3.3 \times 10\text{-}6$ per °K. Soda-lime glass typically has a coefficient of thermal expansion of about $9\text{-}9.5 \times 10\text{-}6$ per °K.

In some embodiments the thermally strengthened glass substrate has a stored energy per unit area greater than the stored energy per unit area in a chemically strengthened glass.

In some embodiments the strengthened glass substrate includes a first surface having a first compressively stressed surface region, an opposing second surface having a second compressively stressed surface region, and an internal center region between the first and second compressively stressed surface regions. The first compressively stressed surface and the second compressively strained surface can each have a thickness of greater than about 250 mm.

Glass substrates of varying thicknesses can be used with the methods disclosed herein. In some embodiments, glass substrates with a thickness of about 1.0 mm or greater can be used. In some embodiments glass substrates with a thickness of at least about 1.6 mm can be used. In some embodiments glass substrates with a thickness of about 2.0 mm or greater can be used. In some embodiments glass substrates with a thickness of greater than 2.2 mm can be used. In some embodiments glass substrates with a thickness of greater than 3.0 mm can be used. In some embodiments glass substrates with a thickness of greater than 4.0 mm can be used. In some embodiments glass substrates with a thickness of greater than 6.0 mm can be used.

Thermally-strengthened glass substrates typically have a thickness of greater than about 1.0 mm. In some embodiments a thermally-strengthened glass substrate with a thickness of greater than about 1.5 mm, greater than about 1.6, greater than about 2.0 mm, greater than about 2.0 mm, or greater than about 3 mm, greater than about 4 mm, or greater than about 6 mm is used. Examples of heat-strengthened glass substrate thicknesses include 1.5 mm, 1.6 mm, and 3.2 mm, 4.0 mm, and 6.0 mm.

In some embodiments glass substrates with a thickness of less than about 1.0 mm can be used. Chemically-strengthened glass substrates can have a thickness of less than about 1.0 mm, especially for applications like mobile devices. Examples of chemically-strengthened substrate thicknesses include 0.3 mm, 0.5 mm, and 0.7 mm.

The size of the glass processed using the laser cutting methods disclosed herein can vary. Standard glass sizes can be used. Examples of various standard glass substrate sizes include 1.1 m by 1.3 m, 1.5 m by 3 m, 2.2 m by 2.6 m, and 3 m by 6 m. In some embodiments the glass substrate has a surface area of at least about $0.25\ \text{m}^2$. In some embodiments the glass substrate has a surface area of at least about $1\ \text{m}^2$. In some embodiments the glass substrate has a surface area of at least about $4\ \text{m}^2$. In some embodiments the glass substrate has a surface area of at least about $6\ \text{m}^2$. In some embodiments the glass substrate has a surface area of at least about $18\ \text{m}^2$.

Applications for chemically-strengthened glass include mobile devices such as cell phones, smart phones, and tablet computers. Chemically-strengthened glass is typically cut into smaller sizes appropriate for phone screens and tablet computer screens. The applications disclosed herein use larger cut pieces than the sizes typically used for mobile devices. In some embodiments, the glass substrate is cut into one or more pieces with at least one of the pieces having a surface area of greater than about $0.25\ \text{m}^2$. In some embodiments, the glass substrate is cut into one or more pieces with at least one of the pieces having a surface area of greater than about $0.5\ \text{m}^2$. In some embodiments, the glass substrate is cut into one or more pieces with at least one of the pieces having a surface area of greater than about $1.0\ \text{m}^2$. In some embodiments, the glass substrate is cut into one or more pieces with at least one of the pieces having a surface area of greater than about $2\ \text{m}^2$. In some embodiments, the glass substrate is cut into one or more pieces with at least one of the pieces having a surface area of greater than about $5\ \text{m}^2$.

In some embodiments the methods disclosed herein can be used to cut a strengthened glass substrate without any coatings.

In some embodiments the glass substrate can support one or more films, layers, glazings, and coatings. The layers can include thin films. The films can be generally coplanar. The films described herein can be in contact with the glass substrate or in contact with one or more other films supported by the glass substrate. In some embodiments the strengthened glass substrate supports two or more layers in a substantially parallel planar relation to the glass substrate and each other. In some embodiments the two or more layers are adjacent to a surface of the glass substrate or a surface of another of the two or more layers.

The laser processes described herein can be used to cut the strengthened glass and films, layers, glazings, and coatings in the desired shape and size. Examples of films include conducting films, oxide films, diffusion barriers, reflective coatings, buffer layers, transparent conducting oxides, electrochromic films, ion conductor, conductive oxides, insulating films, etc.

In some embodiments the one or more films supported on the glass substrate can be in electronic communication with one or more other films supported on the glass substrate. The films in electronic communication can be in direct contact with each other or there can be one or more intervening films or layers.

In some embodiments any of the devices disclosed herein can comprise or include any of the glass substrates described herein. In some embodiments any of the devices disclosed herein can be supported by any of the glass substrates described herein.

In some embodiments the thermally-strengthened glass substrate supports one or more films generally coplanar with each film in contact with the glass substrate surface or another film supported by the glass substrate. In some embodiments the one or more films can be formed on the strengthened glass substrate prior to applying laser energy. Any of the films described herein can have one or more intervening layers between the substrate and the other layers described herein.

In some embodiments a glass substrate composite can be cut using the processes disclosed herein. In some embodiments the composite is a partially fabricated electrochromic device. The partially fabricated composite can include a strengthened glass substrate having a first surface, an electrically conductive layer supported on the first surface of the strengthened glass substrate, and an electrochromic film in electronic communication with the electrically conductive layer. In some embodiments the composite can include a chemically-strengthened glass substrate. In some embodiments the strengthened glass substrate is a thermally-strengthened glass substrate. The electrically conductive layer can comprise a metal or a transparent conductor such as a transparent conductive oxide. Examples of electrochromic films include tungsten oxide ($WO_3$), molybdenum oxide ($MoO3$), niobium oxide ($Nb2O5$), titanium oxide ($TiO2$), copper oxide (CuO), iridium oxide ($Mn_2O_3$), vanadium oxide ($V_2O_3$), nickel oxide ($Ni_2O_3$), cobalt oxide ($Co_2O_3$) and the like. In some embodiments the electrically conductive layer is directly on the strengthened glass substrate. In some embodiments the composite includes one or more generally coplanar films between the first surface of the strengthened glass substrate and the electrically conductive layer. For example, an electrochromic composite could comprise a tempered 3.2 mm thick Pilkington Tec-15 substrate with a 400 nm thick tungsten oxide film coated on top of the FTO surface. In some embodiments an ion conductor is in electronic communication with the conductive layer.

In some embodiments the cut glass piece can be further processed. In some embodiments the cut edges of the glass piece can undergo further processing, such as an edge strengthening processes. In some embodiments the composite is assembled in an electrochromic device after cutting the composite. In some embodiments the cut glass piece can be further assembled into an integrated glass unit. In some embodiments the cut glass piece can be further assembled into an electrochromic device.

In some embodiments methods for fabricating two or more electrochromic composites are provided. The methods include providing an electrochromic composite comprising a strengthened glass substrate having a first surface and an opposing second surface, an electrically conductive layer supported on the first surface of the strengthened glass substrate, and an electrochromic layer in electronic communication with the electrically conductive layer; and applying laser energy to the strengthened glass substrate under conditions effective to cut the strengthened glass substrate to form two or more electrochromic composites. The electrochromic composite can be provided as a mother glass composite comprising an array of two or more spatially discrete electrochromic composites, each comprising a corresponding spatially discrete portion of the strengthened glass substrate. Laser energy can be applied to the strengthened glass substrate to cut the mother glass composite and separate two or more spatially discrete electrochromic composites. The electrochromic composite can be provided as a mother glass composite comprising an array of two or more spatially discrete electrochromic composites, each comprising a corresponding spatially discrete portion of the strengthened glass substrate. Laser energy can applied to the strengthened glass substrate to cut the mother glass composite to form a panel comprising two or more spatially discrete electrochromic composites. An integrated glass unit can be assembled using the one or more electrochromic composites cut from the mother glass composite.

In some embodiments methods for fabricating two or more electrochromic devices are provided. The methods include providing an electrochromic device comprising at least one strengthened glass substrate; and applying laser energy to the electrochromic device under conditions effective to cut the strengthened glass substrate to form two or more electrochromic devices. The electrochromic device can include two electrically conductive layers and an electrochromic cell in electronic communication with the electrically conductive layers. The electrically conductive layers and electrochromic cell can be supported, directly or indirectly, on a surface of the strengthened glass substrate. The electrochromic cell can include an anode, a cathode, and an ion conductor in electronic communication with the anode and cathode with at least one of the anode or cathode comprising an electrochromic material. In some embodiments the cut electrochromic device is assembled into an integrated glass unit.

In some embodiments the electrochromic device includes two transparent conductive oxide layers. In some embodiments the electrochromic device comprises a tungsten mixed metal oxide layer. In some embodiments the electrochromic device comprises a nickel mixed metal oxide layer. In some embodiments the electrochromic device comprises a lithium ion conducting layer. In some embodiments the electrochromic device includes a first strengthened glass substrate that is a chemically-strengthened or thermally-strengthened glass substrate. In some embodiments the electrochromic device includes first and second glass substrates that are chemically-strengthened or thermally-strengthened glass substrates.

As described above in connection with FIG. 6A, in some embodiments the electrochromic device is provided as a mother glass composite. In an approach, the mother glass composite can comprise an integrated, spatially continuous large area electrochromic device prior to cutting. In an alternative approach, the mother glass composite can comprise an array of two or more spatially discrete electrochromic devices prior to cutting. Each of the discrete electrochromic devices can include a corresponding spatially discrete portion of at least one common strengthened glass substrate. Laser energy can be applied to the strengthened glass substrate to cut the mother glass composite and separate the two or more spatially discrete electrochromic devices. An analogous approach can also be employed for fabricating two or more composites (e.g., electrochromic composites such as electrochromic half cells). Accordingly, in some embodiments an electrochromic composite is provided as a mother glass composite comprising an array of two or more spatially discrete electrochromic composites, each comprising a corresponding spatially discrete portion of at least one common strengthened glass substrate. Laser energy can be applied to the strengthened glass substrate to cut the mother glass composite to form a panel comprising two or more spatially discrete electrochromic composites. An integrated glass unit can be assembled using one or more electrochromic devices cut from the mother glass composite. Alternatively, an integrated glass unit can be assembled using one or more electrochromic composites cut from a mother glass composite.

FIG. 6A illustrates a top view of a mother glass composite 400 that is cut into four devices having different shapes. In an approach in which the mother glass composite 400 comprises an array of two or more spatially discrete electrochromic devices 20, each of such devices can each include an edge periphery or a sealed edge periphery. Laser energy can be applied to the common strengthened glass substrate to cut the devices out around the edge periphery or the sealed edge periphery of each device, thereby forming two or more electrochromic devices (e.g., 20-1, 20-2, 20-3, 20-4 of FIG. 6A). Alternatively, where the mother glass composite 400 comprises an array of two or more spatially discrete electrochromic devices 20, the array may be retained as an array of active devices on the at least one common strengthened glass substrate to provide a large area, multi-panel device (e.g., a large area window); in such cases, the approach of the present invention may be used to cut the strengthened glass substrate along a peripheral edge of the mother glass composite 400 (e.g., to trim the peripheral edge of such multi-panel device on the mother glass composite 400). In any case, the device edges can be sealed prior to applying laser energy or after cutting the devices into the desired shapes. In an approach in which the mother glass composite comprises an integrated, spatially continuous large area electrochromic device 20, the device can itself be cut to form two separate electrochromic devices (e.g., 20-1, 20-2, 20-3, 20-4 of FIG. 6A). Additionally, or alternatively, the peripheral edge of such mother glass composite 400 can be trimmed by cutting the strengthened glass substrate along a peripheral edge of the mother glass composite 400.

In some embodiments the electrochromic device comprises: a first glass substrate having a first surface and an opposing second surface, a first electrically conductive layer supported on the first surface of the first glass substrate, and an electrochromic anodic layer in electronic communication with the first electrically conductive layer, a second glass substrate having a first surface and an opposing second surface, a second electrically conductive layer supported on the second surface of the second glass substrate, and an electrochromic cathodic layer in electronic communication with the second electrically conductive layer, and an ion-conducting material in electronic communication with each of the electrochromic anodic layer and the electrochromic cathodic layer.

U.S. Patent Publication No. 2012/0200908 to Bergh et al. ("Bergh et al.") discloses examples of electrochromic coatings and devices, the disclosure of which is incorporated by reference in its entirety herein. The electrochromic device can be made using any of the materials and methods disclosed in Bergh et al.

In some embodiments a transparent conductive oxide layer can be deposited on the glass substrate during the thermal strengthening step. In some embodiments the transparent conductive oxide layer is added after the strengthening step.

In some embodiments the electrode layer can be deposited using sputtering. In some embodiments the electrode layer can be deposited using a wet coating. In some cases the wet coating can be cured. Different materials can be used for the anode and cathode in the electrochromic stack. Any of the materials disclosed in Bergh et al. can be used for the anode and cathode in the electrochromic stack. In some embodiments the first and second electrode layers can be patterned to provide space for a bus bar.

In some embodiments the electrochromic device includes two strengthened glass substrates and the electrochromic device is cut using one or more lasers. In some embodiments multiple passes of the laser can be used to cut a device having two strengthened glass substrates. In some embodiments multiple lasers can be used to cut a device having two strengthened glass substrates at the same time. In some embodiments the two strengthened glass substrates are cut in the same shape. In some embodiments one of the strengthened substrates can be cut in a different size or shape to accommodate a bus bar or the installation of another electronic device.

In some embodiments methods for fabricating an insulated glass unit are provided. The methods can include providing a first mother glass comprising a first strengthened glass substrate; applying laser energy to the first strengthened glass substrate under conditions effective to cut the strengthened glass substrate to form a first glass lite; providing a second glass lite; and assembling the first glass lite and the second glass lite into an insulated glass unit. In some embodiments the mother-glass includes thermally-strengthened glass substrate. In some embodiments the mother-glass includes chemically-strengthened glass substrate. In some embodiments a second mother-glass is provided comprising a second strengthened glass substrate. A second glass lite can be formed by cutting the second strengthened glass substrate. In some embodiments the second strengthened glass substrate is a thermally-strengthened glass substrate. In some embodiments the second strengthened glass substrate is a chemically-strengthened glass substrate.

In some embodiments the first and/or second strengthened glass substrate can be provided as a component of an electrochromic composite. The electrochromic composite can include an electrically conductive layer supported on a surface of the first strengthened glass substrate and an electrochromic layer in electronic communication with the electrically conductive layer. In some embodiments the first and/or second strengthened glass substrate can be provided as a component of an electrochromic device.

In some embodiments the methods disclosed herein can be performed in a clean room or other controlled environment.

In some embodiments devices are provided including any of the cut glasses described herein. In some embodiments a piece of cut glass is provided. The cut glass can include a thermally-strengthened glass substrate having a first surface, an opposing second surface, and a peripheral edge between the first surface and the second surface, the edge having indicia of a laser filamentation cutting process.

In some embodiments an electrochromic composite is provided. The electrochromic composite includes a strengthened glass substrate having a first surface, an opposing second surface, and a peripheral edge between the first surface and second surface, the edge having indicia of a laser filamentation cutting process; an electrically conductive layer supported on the first surface of the strengthened glass substrate; and an electrochromic layer in electronic communication with the electrically conductive layer. The indicia of the laser filamentation process are described herein. In some embodiments the conductive layer directly contacts the first surface of the strengthened glass substrate. In some embodiments one or more generally coplanar layers can be between the conductive layer and the first surface of the strengthened glass substrate. In some embodiments the electrochromic composite includes a coating on the peripheral edge of the strengthened glass comprising metal, oxide material, or a polymer layer.

In some embodiments an electrochromic device is provided. The electrochromic device can include at least one strengthened glass substrate having a first surface, an opposing second surface and a peripheral edge between the first surface and second surface, the peripheral edge having indicia of a laser filamentation cutting process. The indicia of the laser filamentation process are described herein.

The electrochromic device can include two electrically conductive layers and an electrochromic cell in electronic communication with the electrically conductive layers with the electrically conductive layers and electrochromic cell being supported, directly or indirectly, on the first surface or second surface of the strengthened glass substrate. The electrochromic cell can include an anode layer, a cathode layer, and an ion conductor layer in electronic communication with the anode and cathode layers with at least one of the anode or cathode comprising an electrochromic material.

In some embodiments the electrochromic device comprises a first glass substrate having a first surface and an opposing second surface, a first electrically conductive layer supported on the first surface of the first glass substrate, and an electrochromic anodic layer in electronic communication with the first electrically conductive layer, a second glass substrate having a first surface and an opposing second surface, a second electrically conductive layer supported on the second surface of the second glass substrate, and an electrochromic cathodic layer in electronic communication with the second electrically conductive layer, and an ion-conducting material in electronic communication with each of the electrochromic anodic layer and the electrochromic cathodic layer, at least one of the first glass substrate and the second glass substrate being a strengthened glass substrate having a peripheral edge between the first surface and second surface, the peripheral edge having indicia of a laser filamentation cutting process.

In some embodiments each of the first glass substrate and the second glass substrate are a strengthened glass substrate. In some embodiments each of the first glass substrate and the second glass substrate are a strengthened glass substrate having a peripheral edge between the first surface and second surface with each of the peripheral edges having indicia of a laser filamentation cutting process. In some embodiments at least one strengthened glass substrate is a chemically-strengthened glass substrate. In some embodiments at least one strengthened glass substrate is a thermally-strengthened glass substrate.

In some embodiments an insulated glass unit is provided. The insulated glass unit can include a first lite comprising strengthened glass having a first surface, an opposing second surface and a first peripheral edge between the first surface and second surface, a second lite comprising glass having a first surface, an opposing second surface, and a second peripheral edge between the first surface and second surface, a spacer element providing spatial separation between the first glass lite and the second glass lite, at least one of first peripheral edge or the second peripheral edge having indicia of a laser filamentation cutting process. The second lite can comprise a strengthened glass lite. The first and second lites can comprise chemically-strengthened glass. The first and second lites can comprise thermally-strengthened glass. The first lite can support one or more films generally coplanar and each film in contact with the glass substrate surface or another film supported by the substrate. The second lite can support one or more films generally coplanar and each film in contact with the glass substrate surface or another film supported by the substrate. The first and/or second lite can include an electrochromic material or support an electrochromic cell or an electrochromic device.

Example 1

A glass substrate for use in a window is first heat strengthened to reach the necessary surface stress for the final window product. In most cases a surface stress of around 65 MPa is sufficient but this can vary depending on the installation location and other factors. The glass substrate is then coated with a first layer of an electrochromic film. The first layer of the electrochromic film can be cured at a temperature of less than 300° C. Some processes do not require a cure post coating, for example sputtered electrochromic layers do not typically require a thermal treatment after deposition. In parallel, a matching counter electrode electrochromic layer is coated on another strengthened glass substrate of equal size to the first glass substrate. The counter electrode electrochromic layer may be cured or not cured.

The two coated strengthened glass substrates are then laminated together with a polymer between the two glass substrates which has the necessary ion conductivity properties to make a functional electrochromic device.

The resulting electrochromic window can then be cut down to a number of different sizes and shapes to meet customer demand. The cutting is done with a laser cutting system that is optimized to cut the electrochromic window comprising strengthened glass. The laser cutting process is a laser filamentation process which consists in irradiating the window with laser energy along a desired cut line. The laser settings are optimized to produce a filamentary interaction within the thickness of both pieces of glass forming the electrochromic window. The laser interaction is contained within a very narrow volume which prevents the glass from shattering during the process. The window is then cleaved or separated along the cutting line. Repeating these processes at different angles and suitable locations it is possible to create a cut edge on a laminated part that is chamfered. By further repeating this process it is possible to create a cut edge on a laminated part that approximates a cylindrical or pencil edge. See FIG. 7B.

Example 2

A soda-lime glass substrate is provided. The soda-lime glass is processed to add a transparent conducting oxide (TCO) layer during the thermal-strengthening process. The soda-lime glass undergoes a custom high temperature TCO process where the glass reaches a temperature of around 650° C. The substrate is subsequently cooled at a rate that induces a surface stress of around 60 MPa. The TCO-coated, heat-strengthened glass is then coated with an electrochromic coating and calcined at a temperature of around 300° C. for around 1 hour.

The thermally-strengthened glass substrate can then be assembled into a large device with a strengthened glass pair using a polymer ion conductor between the two pieces of strengthened glass. The assembled device is then cut down into the desired smaller device sizes using the laser filamentation processes described herein.

Example 3

A 3.2 mm soda-lime glass substrate from Pilkington (TEC-15 TQ) is cleaned, heat-strengthened or tempered and then cleaned again. After cleaning, the substrate is coated with a cathode solution using slot-coating, spray coating, or dip coating. The wet coated cathode film is subsequently dried using air, heating, vacuum, or a combination or sequence of these methods. After the film is dried the cathode film is heated to a temperature between about 250° C. and about 550° C. in a controlled environment, e.g. clean dry air, to create the desired cathode material.

A second 3.2 mm soda-lime glass substrate from Pilkington (TEC-15 TQ) is cleaned, heat-strengthened or tempered and then cleaned again. After cleaning the substrate is coated with an anode solution using slot-coating, spray coating, or dip coating. The wet coated cathode film is subsequently dried using air, heating, vacuum, or a combination or sequence of these methods. After the film is dried the cathode film is heated to a temperature between about 250° C. and about 550° C. in a controlled environment, e.g. clean dry air, to create the desired anode material.

The cathode coated glass substrate is then coated with a polymeric ion conductor film using a stencil printing or screen printing process. This polymer film may require a thermal or vacuum drying step or a thermal or UV curing step post coating. Optionally, the anode coated glass substrate is also coated with a polymeric ion conductor film using a stencil printing or screen printing process. This polymer film may also require a thermal or vacuum drying step or a thermal or UV curing step post coating.

The anode substrate and cathode substrate are then laminated together in a vacuum lamination process where the substrates are laminated at an elevated temperature, e.g. about 90° C. to about 180° C., and under pressure, typically about 10 psi to about 25 psi.

After lamination, individual devices are cut from the glass using the laser filamentation processes described herein with laser parameters optimized for cutting heat strengthened or tempered glass. In one approach, each substrate forming the laminate is can from each side allowing the two substrates to be cut at the same location or different locations in the plane. By focusing the laser at a point inside the laminate near the third surface the laser encounters it is possible to cut just the second glass substrate. By creating two parallel and offset cuts in each piece of glass it is possible to create an edge that exposes the inner surface of one of the substrates. This is useful for exposing the TCO film at the edge of one substrate for bus bar attachment and electrical contact. It is also possible to generate such a stepped edge by creating one cut through both pieces of glass and a parallel and offset in the direction of the resultant device. This approach has the advantage that both cuts can be produces from laser energy being applied from one side of the mother glass.

Example 4

In this example a chemically-strengthened glass substrate is cut with a smooth edge using a laser filamentation process. First, a borosilicate glass, soda lime glass, or aluminosilicate glass substrate is chemically toughened to reach a surface stress of around 400 to 800 MPa. The chemically-strengthened glass substrate is then coated with a low temperature, e.g. less than 250° C. TCO film. A low temperature is used to preserve the chemical-strengthening of the substrate. A proprietary electrochromic coating can then be formed on the glass substrate. The glass substrate is then calcined at a temperature of around 300° C. for around 1 hour. The glass substrate is then assembled into a device with a glass substrate pair using a polymer ion conductor. The device is then cut down into smaller devices using a laser filamentation process. The "low" temperature process flow and the use of the laser filamentation process can result in cutting the chemically-strengthened glass substrate without producing cracks and defects around the cut. An electrochromic device with improved edge and strength is produced.

Example 5

Figure 20:
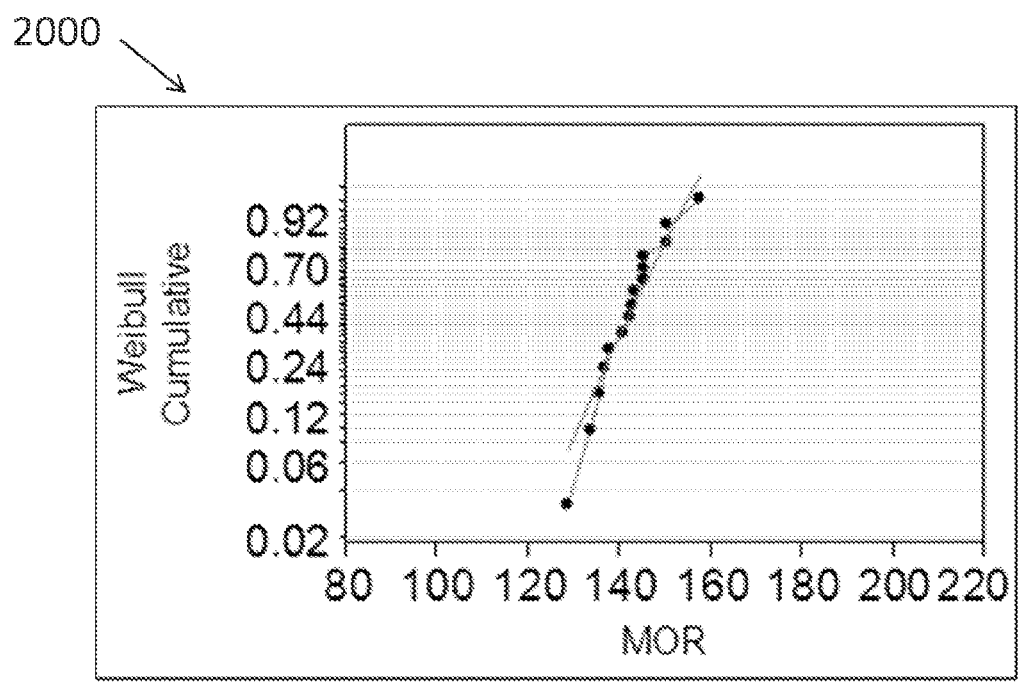
FIG. 20 is a graph of the modulus of rupture distribution fit by a Weibull distribution of the results of the tests described in Example 5.

A set of 15 pieces of heat-strengthened, soda-lime glass, 3.2 mm thick, and having an average surface stress of 40 MPa, was tested using an Instron 3366 equipped with a four point bending fixture, according to the testing specification described in ASTM C1048. The test data was fit to a Weibull distribution. The characteristic strength, and Weibull modulus are 145 MPa and 20, respectively. All samples had a modulus of rupture greater than 100 MPa. The modulus of rupture distribution fit by a Weibull distribution of the results of the foregoing tests are shown on table 2000 of FIG. 20.

Example 6

A set of 15 pieces of heat-strengthened, soda-lime glass, 3.2 mm thick, and having an average surface stress of 85 MPa, was tested using an Instron 3366 equipped with a four point bending fixture, according to the testing specification described in ASTM C1048. The test data was fit to a Weibull distribution. The characteristic strength, and Weibull modulus are 164.6 MPa and 16.8, respectively. All samples had a modulus of rupture greater than 100 MPa.

Figure 21:
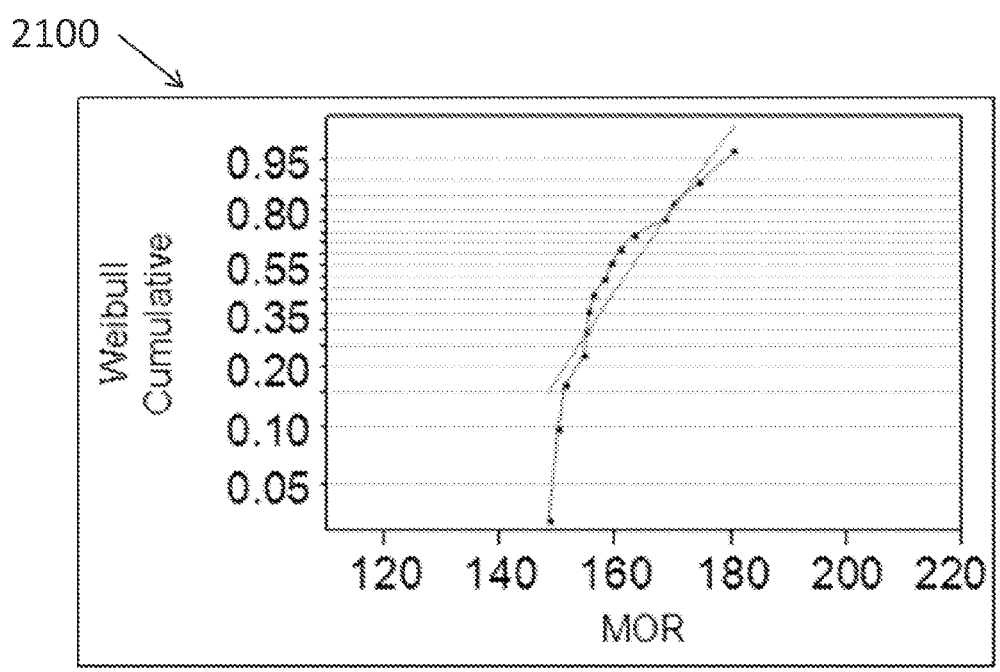
FIG. 21 is a graph of the modulus of rupture distribution fit by a Weibull distribution of the results of the tests described in Example 6.

The modulus of rupture distribution fit by a Weibull distribution of the results of the foregoing tests are shown on table 2100 of FIG. 21.

Example 7

Figure 22:
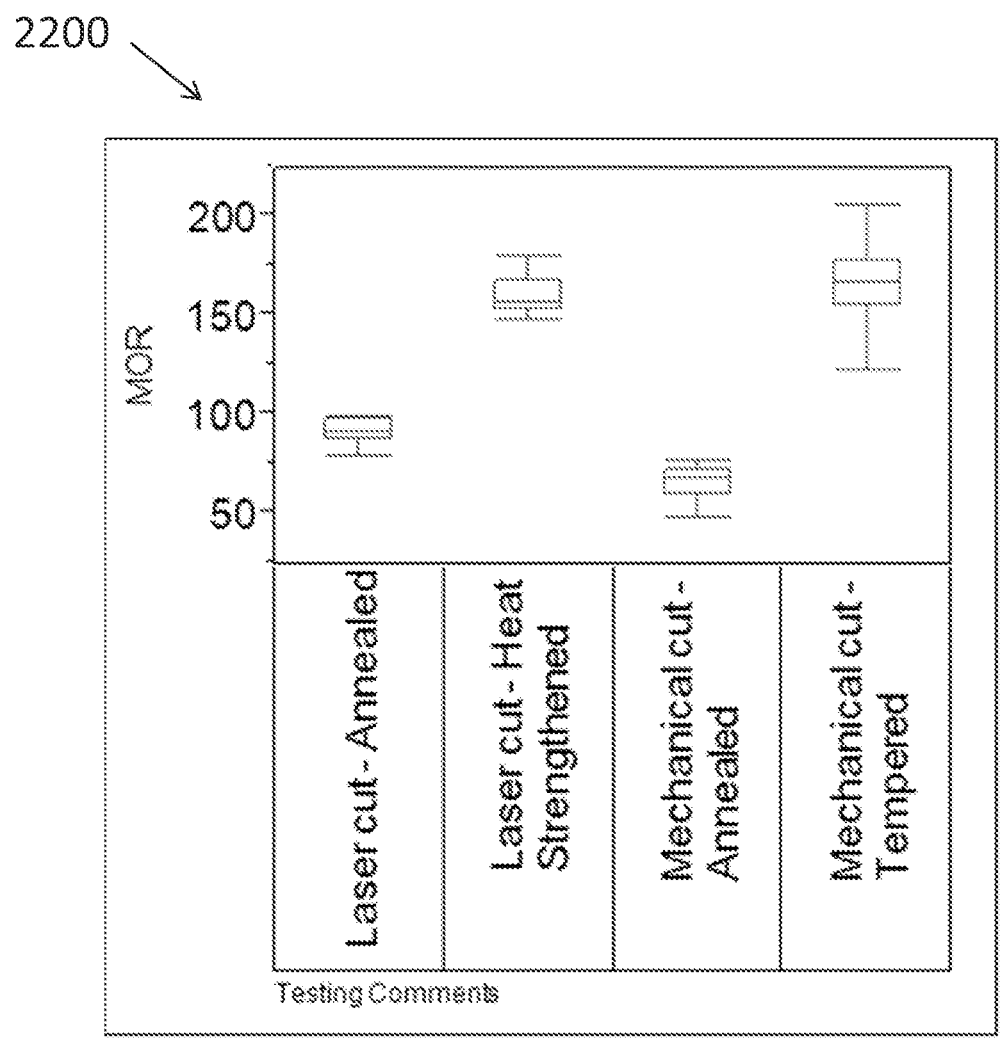
FIG. 22 is a table illustrating the strengths of laser cut annealed SLG and mechanically cut annealed glass.

As illustrated by table 2200 of FIG. 22, laser cut annealed SLG is stronger than mechanically cut annealed glass. Laser cut, 85 MPa surface stress glass is comparable in strength to the 110 MPa mechanically pre-cut (before tempering) samples.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. The present invention descriptions are intended to cover such alternatives, modifications, and equivalents as may be included within the spirit and scope of the invention as defined by the appended claims and otherwise appreciated by one of ordinary skill in the art.

What is claimed is:

1. A method for cutting thermally-strengthened glass, comprising:
   providing a thermally-strengthened glass substrate wherein the thermally-strengthened glass substrate has a first surface and an opposing second surface;
   applying laser energy to the thermally-strengthened glass substrate under conditions effective to cut the thermally-strengthened glass substrate, wherein applying laser energy comprises:
   focusing the laser energy at a first position on or in proximity of the first surface; and
   pulsing the laser energy for a pulse duration ranging from about 10 femtoseconds to about 100 picoseconds at a pulse frequency ranging from about 100 kHz to about 100 MHz, the pulsed laser energy having a pulse energy of about 1 µJ to about 400 µJ, and having a wavelength of about 250 nm to about 1100 nm; and
   wherein the laser energy forms a filamentation pattern defined by a series of regularly recurring substantially parallel filamentation traces in the thermally-strengthened glass substrate.

2. The method of claim 1 further comprising translating the laser energy relative to a surface of the strengthened glass substrate at a speed ranging from 10 cm/s to 500 cm/s.

3. The method of claim 1 wherein the laser energy is applied to the thermally-strengthened glass substrate under conditions effective to cut the thermally-strengthened glass substrate into two or more cut pieces, at least one of the cut pieces having a modulus of rupture of greater than about 100 MPa, a set of the cut pieces having a probability of failure of less than about 5% under a 40 MPa load, and the two or more cut pieces having a Weibull modulus greater than 10.

4. The method of claim 1 wherein the strengthened glass substrate has a first surface, an opposing second surface and a thickness defined by the perpendicular distance between the first surface and the second surface, wherein the laser energy comprises a focal point and wherein conditions effective to cut the strengthened glass substrate include:
   (a) translating the focal point of the laser energy relative to the first surface,
   (b) repeating the steps of pulsing the laser energy and translating the focal point of the laser energy to form a filamentation pattern defined by a series of regularly recurring substantially parallel filamentation traces, and
   (c) separating the strengthened glass substrate along the filamentation pattern to form two or more cut pieces of the strengthened glass substrate.

5. The method claim 1 wherein the strengthened glass substrate has a first surface, an opposing second surface, and a thickness defined by the perpendicular distance between the first surface and the second surface, the thickness being at least about 1.6 mm; and wherein the first surface has a surface area of at least 1 $m^2$.

6. The method of claim 1, further comprising protecting a cut edge of the strengthened glass substrate by coating it with a metal, oxide material, or polymer layer.

7. The method of claim 1, further comprising forming one or more layers on the strengthened glass substrate prior to applying the laser energy, wherein one of the layers is an electrochromic layer.

8. The method of claim 1, further comprising assembling an electrochromic device using a cut piece of the strengthened glass substrate.

9. The method of claim 1, further comprising assembling an integrated glass unit using a cut piece of the strengthened glass substrate.

10. The method of claim 1, wherein the series of filamentation traces extends from a first surface of the thermally-strengthened glass substrate toward a second surface of the thermally-strengthened glass substrate to a depth of at least 75% of the thickness as detected by optical microscopy.

11. The method of claim 10, wherein the series of filamentation traces extends from the first surface toward the second surface to a depth of at least 90% of the thickness.

12. A method for fabricating two or more electrochromic composites, the method comprising:
   providing an electrochromic composite comprising a strengthened glass substrate having a first surface and an opposing second surface, an electrically conductive layer supported on the first surface of the strengthened glass substrate, and an electrochromic layer in electronic communication with the electrically conductive layer; and
   applying laser energy to the strengthened glass substrate under conditions effective to cut the strengthened glass substrate to form two or more electrochromic composites, wherein the laser energy forms a filamentation pattern defined by a series of regularly recurring substantially parallel filamentation traces in the strengthened glass substrate extending from a first surface of the strengthened glass substrate toward a second surface of the strengthened glass substrate to a depth of at least 75% of the thickness as detected by optical microscopy.

13. The method of claim 12, wherein the strengthened glass substrate is a thermally-strengthened glass substrate.

14. The method of claim 12, wherein the electrochromic composite is provided as a mother glass composite comprising an array of two or more spatially discrete electrochromic composites, each comprising a corresponding spatially discrete portion of the strengthened glass substrate, and the laser energy is applied to the strengthened glass substrate to cut the mother glass composite and separate two or more spatially discrete electrochromic composites.

15. The method of claim 12, wherein applying laser energy comprises pulsing the laser energy for a pulse duration ranging from about 10 femtoseconds to about 100 picoseconds at a pulse frequency ranging from about 100 kHz to about 100 MHz, the pulsed laser having a pulse energy of about 1 µJ to about 400 µJ, and having a wavelength of about 250 nm to about 1100 nm.

16. The method of claim 12 further comprising translating the laser energy relative to a surface of the strengthened glass substrate at a speed ranging from 10 cm/s to 500 cm/s.

17. The method of claim 12, wherein the laser energy is applied to the strengthened glass substrate under conditions effective to cut the strengthened glass substrate into two or more cut pieces, at least one of the cut pieces having a modulus of rupture of greater than about 100 MPa, a set of the cut pieces having a probability of failure of less than about 5% under a 40 MPa load, and the two or more cut pieces having a Weibull modulus greater than 10.

18. The method of claim 12, wherein the strengthened glass substrate has a first surface, an opposing second surface, and a thickness defined by the perpendicular distance between the first surface and the second surface, the thickness being at least about 1.6 mm.

19. The method of claim 12, further comprising protecting a cut edge of the strengthened glass substrate by coating it with a metal, oxide material, or polymer layer.

20. The method of claim 12, further comprising assembling an integrated glass unit using a cut piece of the composite.

21. The method of claim 12, wherein the series of filamentation traces extends from the first surface toward the second surface to a depth of at least 90% of the thickness.

22. A method for fabricating an insulated glass unit, the method comprising:

providing a first mother glass comprising a first strengthened glass substrate;

applying laser energy to the first strengthened glass substrate under conditions effective to cut the strengthened glass substrate to form a first glass lite, wherein applying laser energy comprises pulsing the laser energy for a pulse duration ranging from about 10 femtoseconds to about 100 picoseconds at a pulse frequency ranging from about 100 kHz to about 100 MHz, the pulsed laser having a pulse energy of about 1 µJ to about 400 µJ, and having a wavelength of about 250 nm to about 1100 nm;

providing a second glass lite; and assembling the first glass lite and the second glass lite into an insulated glass unit.

23. The method of claim 22, wherein the first strengthened glass substrate is provided as a component of an electrochromic device.

24. The method of claim 22, wherein the laser energy is applied to the strengthened glass substrate under conditions effective to cut the strengthened glass substrate into two or more cut pieces, at least one of the cut pieces having a modulus of rupture of greater than about 100 MPa and a set of the cut pieces having a probability of failure of less than about 5% under a 40 MPa load and a Weibull modulus greater than 10.

* * * * *